United States Patent
Liljenstolpe et al.

(10) Patent No.: US 8,923,296 B2
(45) Date of Patent: Dec. 30, 2014

(54) SYSTEM AND METHODS FOR MANAGING NETWORK PACKET FORWARDING WITH A CONTROLLER

(75) Inventors: Christopher D. Liljenstolpe, San Francisco, CA (US); R. Kyle Forster, San Francisco, CA (US); Daniel C. Hersey, Peoria, AZ (US); Balaji Sivasubramanian, Milpitas, CA (US)

(73) Assignee: Big Switch Networks, Inc., Mountain View, CA (US)

( * ) Notice: Subject to any disclaimer, the term of this patent is extended or adjusted under 35 U.S.C. 154(b) by 174 days.

(21) Appl. No.: 13/403,776

(22) Filed: Feb. 23, 2012

(65) Prior Publication Data

US 2013/0223444 A1    Aug. 29, 2013

(51) Int. Cl.
| | |
|---|---|
| *H04L 12/56* | (2006.01) |
| *H04L 29/06* | (2006.01) |
| *H04L 12/741* | (2013.01) |
| *H04L 29/12* | (2006.01) |
| *H04L 12/713* | (2013.01) |
| *H04L 12/721* | (2013.01) |

(52) U.S. Cl.
CPC .......... *H04L 45/745* (2013.01); *H04L 29/0653* (2013.01); *H04L 45/586* (2013.01); *H04L 45/44* (2013.01); *H04L 61/103* (2013.01)
USPC .......................................................... 370/392

(58) Field of Classification Search
USPC ................... 370/392; 709/222, 241
See application file for complete search history.

(56) References Cited

U.S. PATENT DOCUMENTS

| | | | |
|---|---|---|---|
| 7,340,250 B2 | 3/2008 | Sanchez | |
| 7,835,355 B2 | 11/2010 | Miyata | |
| 8,296,459 B1 * | 10/2012 | Brandwine et al. | 709/241 |
| 2007/0005736 A1 | 1/2007 | Hansen et al. | |
| 2009/0109986 A1 | 4/2009 | Zhao et al. | |
| 2010/0322263 A1 * | 12/2010 | Allan et al. | 370/403 |
| 2011/0320577 A1 | 12/2011 | Bhat et al. | |
| 2012/0023231 A1 | 1/2012 | Ueno | |
| 2012/0144014 A1 * | 6/2012 | Natham et al. | 709/224 |
| 2012/0182993 A1 * | 7/2012 | Hadas et al. | 370/392 |
| 2013/0094357 A1 * | 4/2013 | Sankar et al. | 370/230 |

OTHER PUBLICATIONS

Casado et al., "SANE: A Protection Architecture for Enterprise Networks," Usenix Security, Aug. 2006 (15 pages).

(Continued)

*Primary Examiner* — Hoon J Chung
*Assistant Examiner* — Yaotang Wang
(74) *Attorney, Agent, or Firm* — Treyz Law Group; Chih-Yun Wu; Jason Tsai

(57) ABSTRACT

A network controlled by a controller may include end hosts that are coupled to the switches. The network may be coupled to gateways that interface between the network and an external network. The network may include subnetworks formed from respective portions of the end hosts of the network. The controller may create virtual gateways that interface between each of the subnetworks and the network by providing the end hosts of each subnetwork with virtual gateway Ethernet addresses. The controller may receive a network packet having a virtual gateway Ethernet address from an end host of a given subnetwork. The network packet may be destined for an end host of an external network or subnetwork. The controller may forward the network packet to the destination end host by redirecting the network packet through a selected gateway or by controlling the switches to perform gateway functions.

14 Claims, 24 Drawing Sheets

(56) References Cited

OTHER PUBLICATIONS

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.

Pfaff et al., OpenFlow Switch Specification, Dec. 31, 2009, 42 pages.

McKeown et al., OpenFlow: Enabling Innovation in Campus Networks, Mar. 14, 2008, 6 pages.

Cisco Systems, Cisco Catalyst 6500 Architecture, 1992-2007, 28 pages.

\* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

| DESTINATION IP ADDRESS | DESTINATION ETHERNET ADDRESS | | ACTION |
|---|---|---|---|
| ... | | | |
| IP ADDRESS OF A DESTINATION END HOST | VIRTUAL GATEWAY ETHERNET ADDRESS | ... | REDIRECT NETWORK PACKET TO DESTINATION END HOST AND PERFORM GATEWAY FUNCTION(S) |

FLOW TABLE ENTRY ⟵ 181

FIG. 19

SYSTEM AND METHODS FOR MANAGING NETWORK PACKET FORWARDING WITH A CONTROLLER

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

A network controlled by a controller can be connected to external networks via gateway devices that interface between the network and the external networks. Network packets that are sent from end hosts of the network to end hosts of the external networks are routed through one or more of the gateway devices. It may be difficult for the network packets to be efficiently routed from the network to the external networks. For example, end hosts in the network may have limited information regarding gateways that are available to interface with the external networks.

SUMMARY

A controller such as a centralized controller server or a distributed controller may be used to control switches in a network. The network may include end hosts that are coupled to the switches. The network may be coupled to gateways that interface between the network and an external network. The network may include subnetworks formed from respective portions of the end hosts of the network. The subnetworks may be assigned corresponding virtual gateway hardware addresses (e.g., Ethernet addresses) and virtual gateway network addresses (e.g., Internet Protocol addresses).

The controller may create virtual gateways by providing the end hosts of each subnetwork with virtual gateway Ethernet addresses in response to requests such as Address Resolution Protocol requests that are sent by the end hosts. The virtual gateways may be used by the end hosts to communicate with end hosts of other subnetworks or the external network. For example, the end hosts may send network packets for an external network by forming the network packets with appropriate virtual gateway Ethernet addresses stored in destination Ethernet address fields of the network packets.

The controller may receive a network packet from an end host of a given subnetwork that is destined for an external network or subnetwork (e.g., a subnetwork that is different from the given subnetwork). The controller may select one of the gateways and direct the switches to forward the network packet through the selected gateway. The controller may retrieve information such as source and destination address information from the network packet and use the retrieved information along with network topology information to select the gateway.

The selected gateway may include interfaces through which network traffic flows. In some scenarios, the selected gateway may perform Internet Control Message Protocol (ICMP) redirect functions that generate messages in response to receiving network packets from the network at an interface that is also used for forwarding network traffic from the gateway to the network. In these scenarios, a first interface of the gateway may be reserved for network traffic from the gateway to the network, whereas a second interface of the gateway may be reserved for network traffic from the network to the gateway. The controller may direct the switches to forward the network packet through the second interface of the selected gateway so that network traffic to the gateway is routed to a different interface than network traffic from the gateway.

If desired, the controller may control the switches to perform gateway functions. For example, the controller may control the switches to decrement a time-to-live header field of network packets that are destined for external networks or subnetworks. In response to determining that a network packet is destined for an end host of an external network, the controller may control the switches to redirect the network packet to a selected gateway. In response to determining that a network packet is destined for an external subnetwork, the controller may control the switches to redirect the network packet to the destination end host.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 19 is a diagram of an illustrative flow table entry that may be provided by a controller to direct switches to perform gateway functions in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
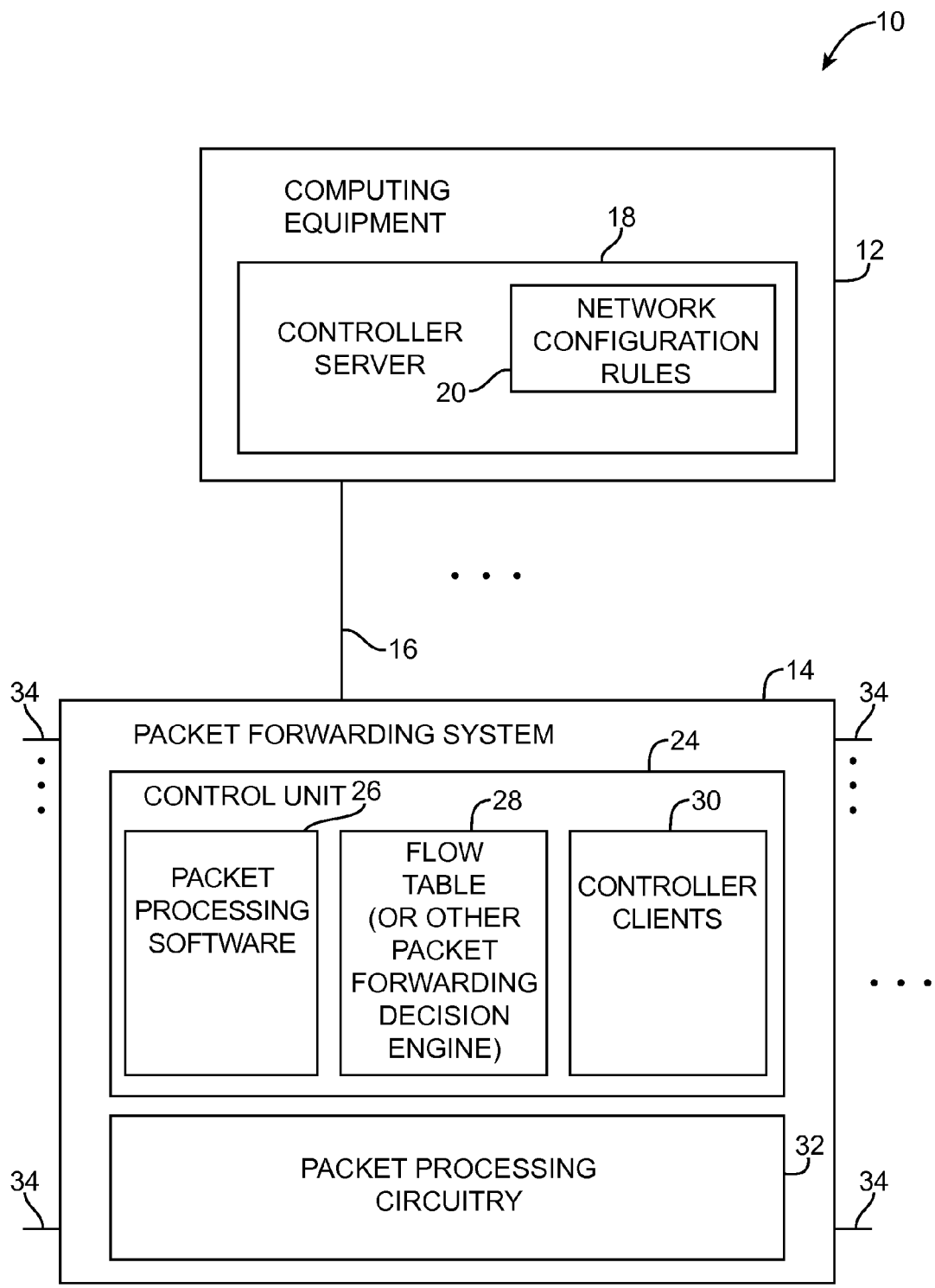
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
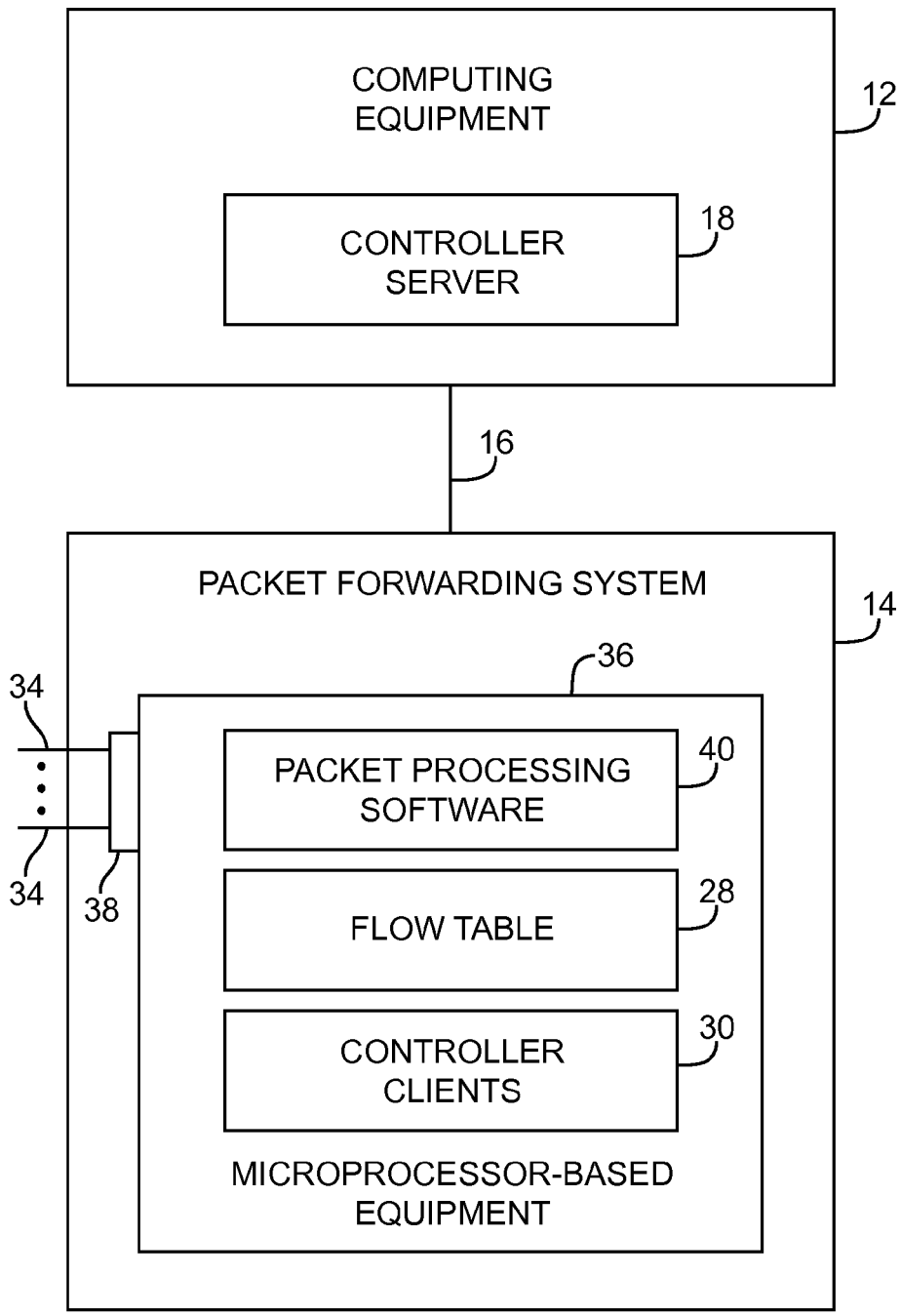
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
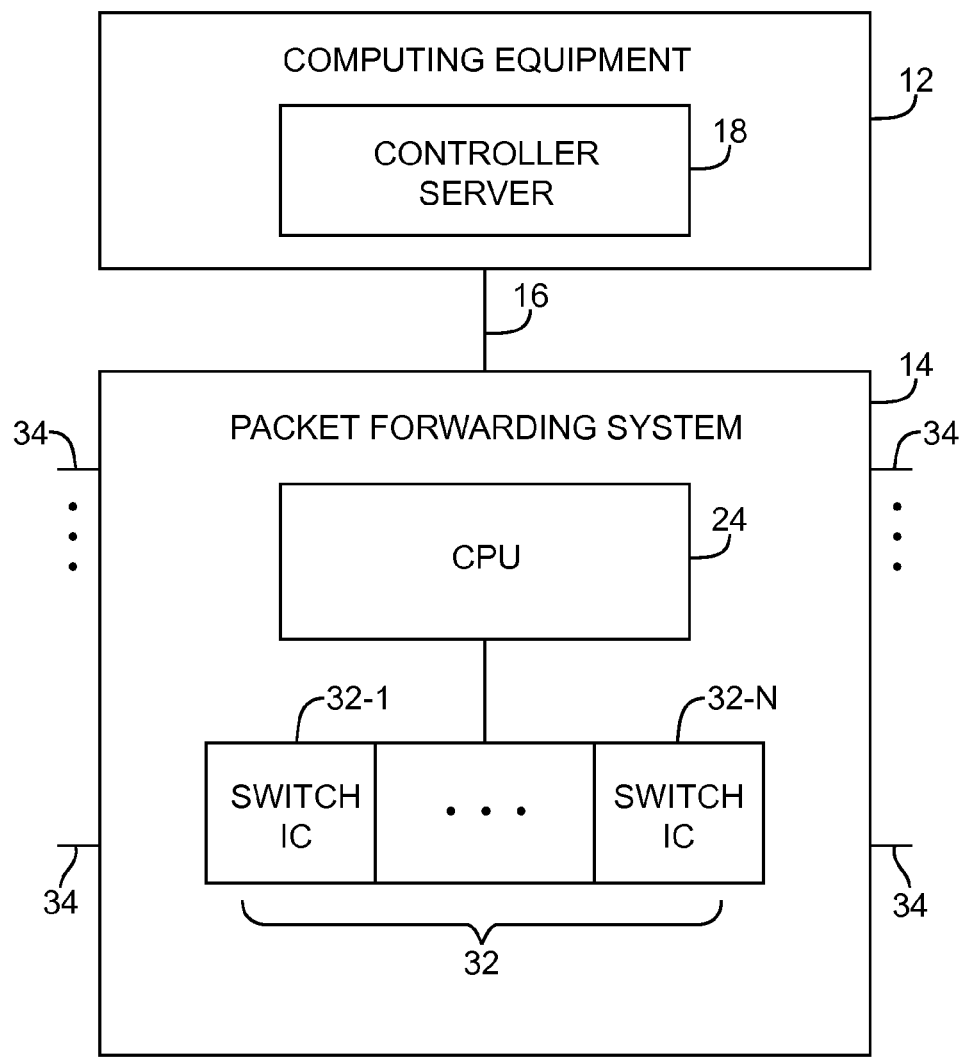
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
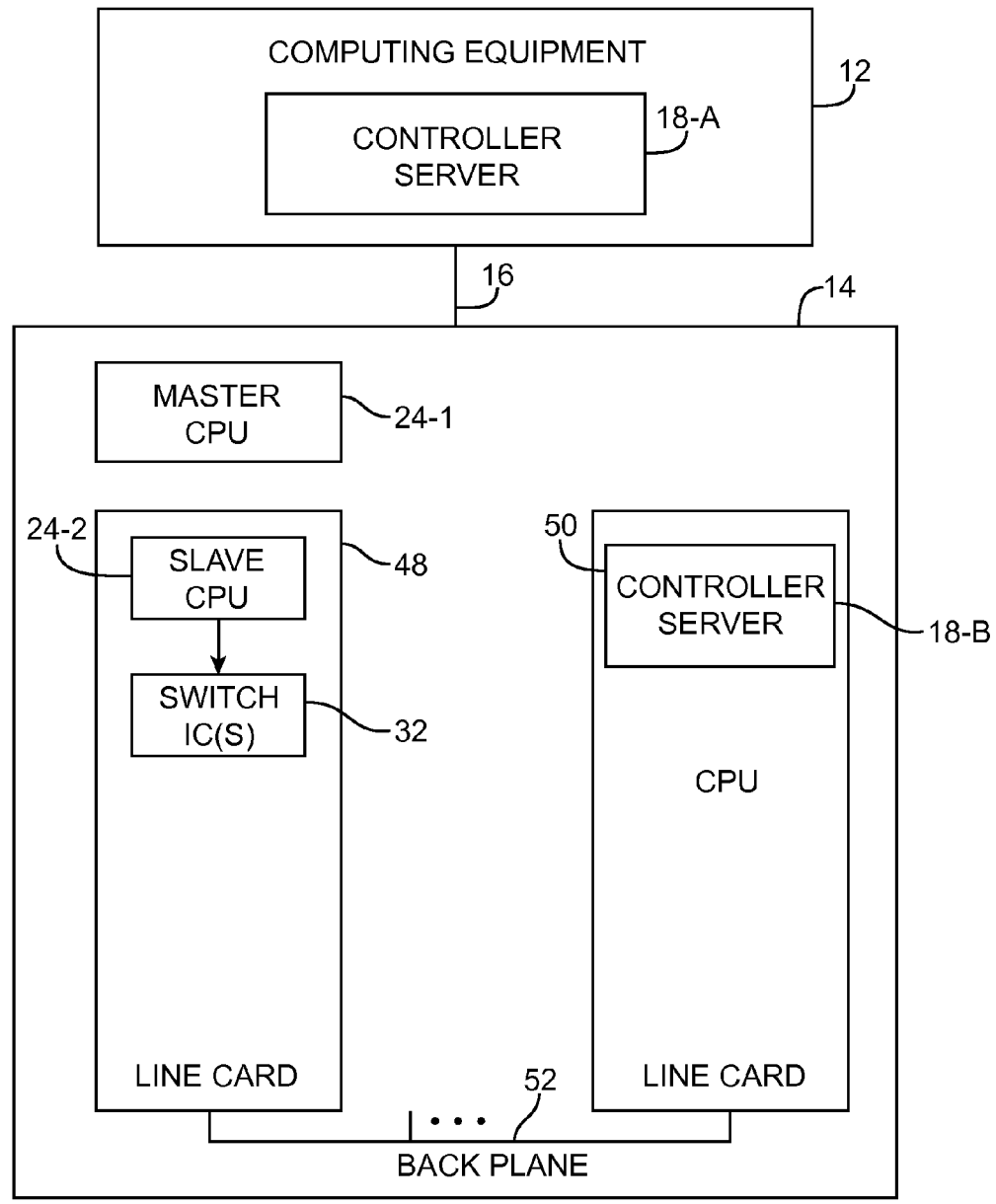
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
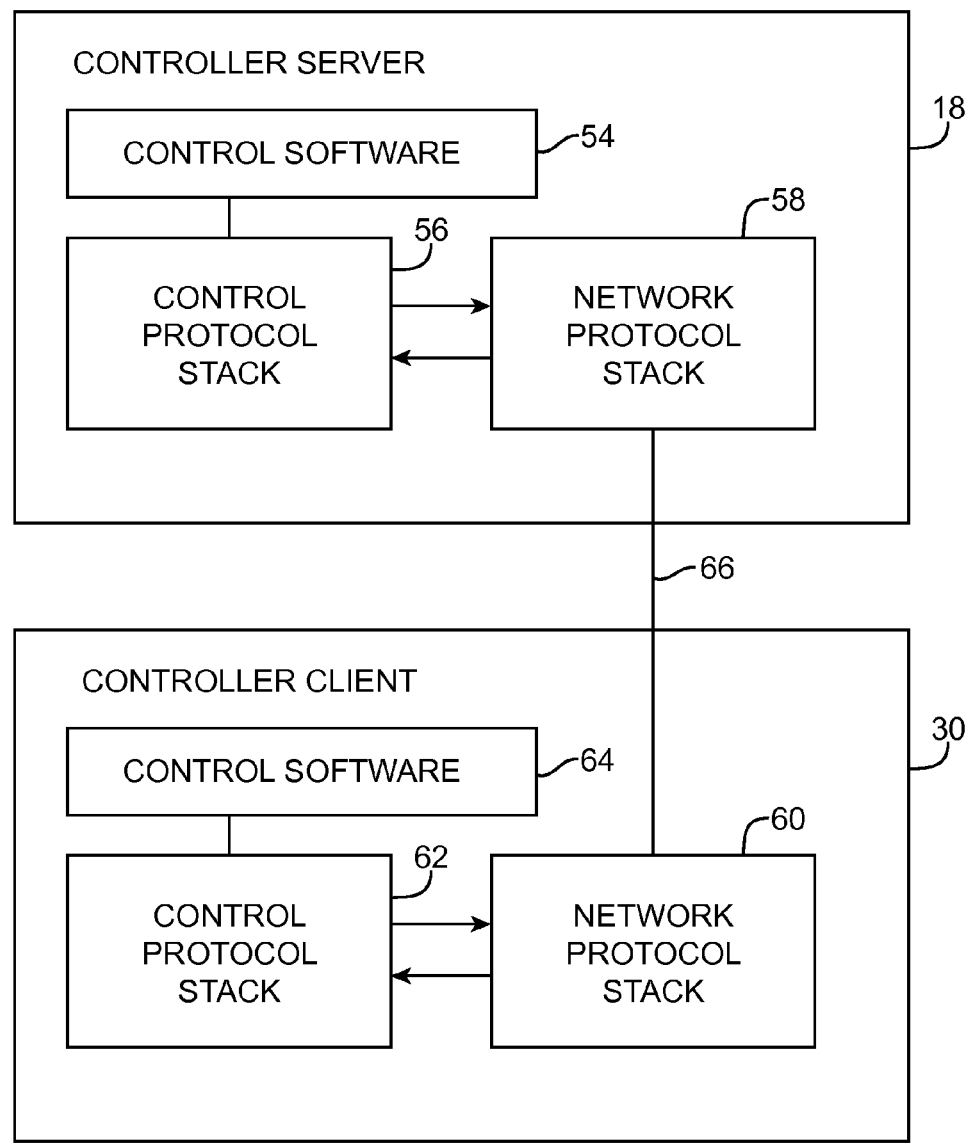
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
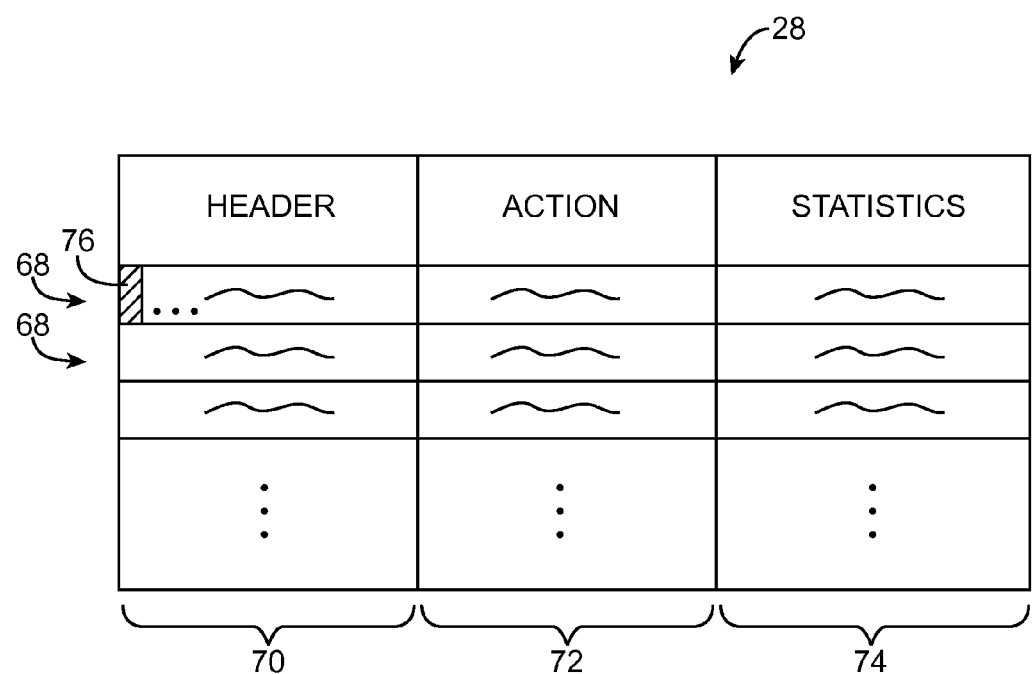
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
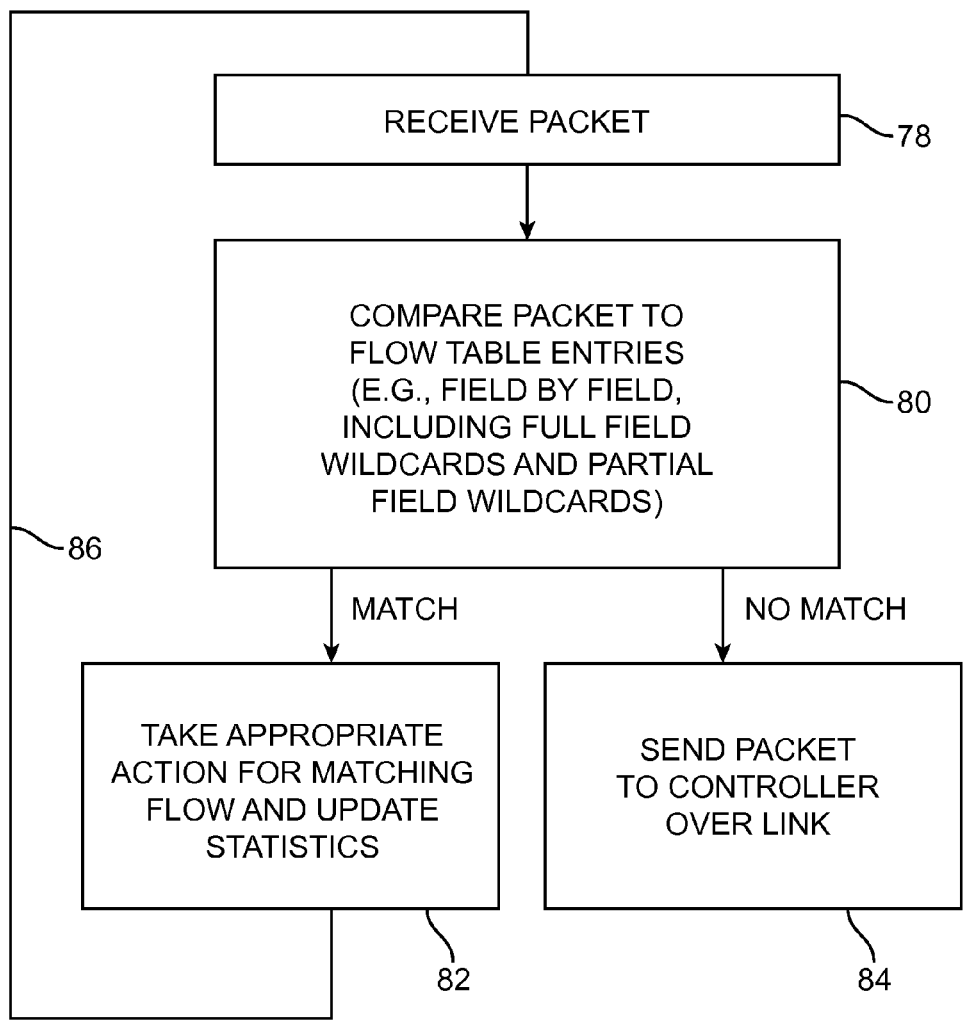
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
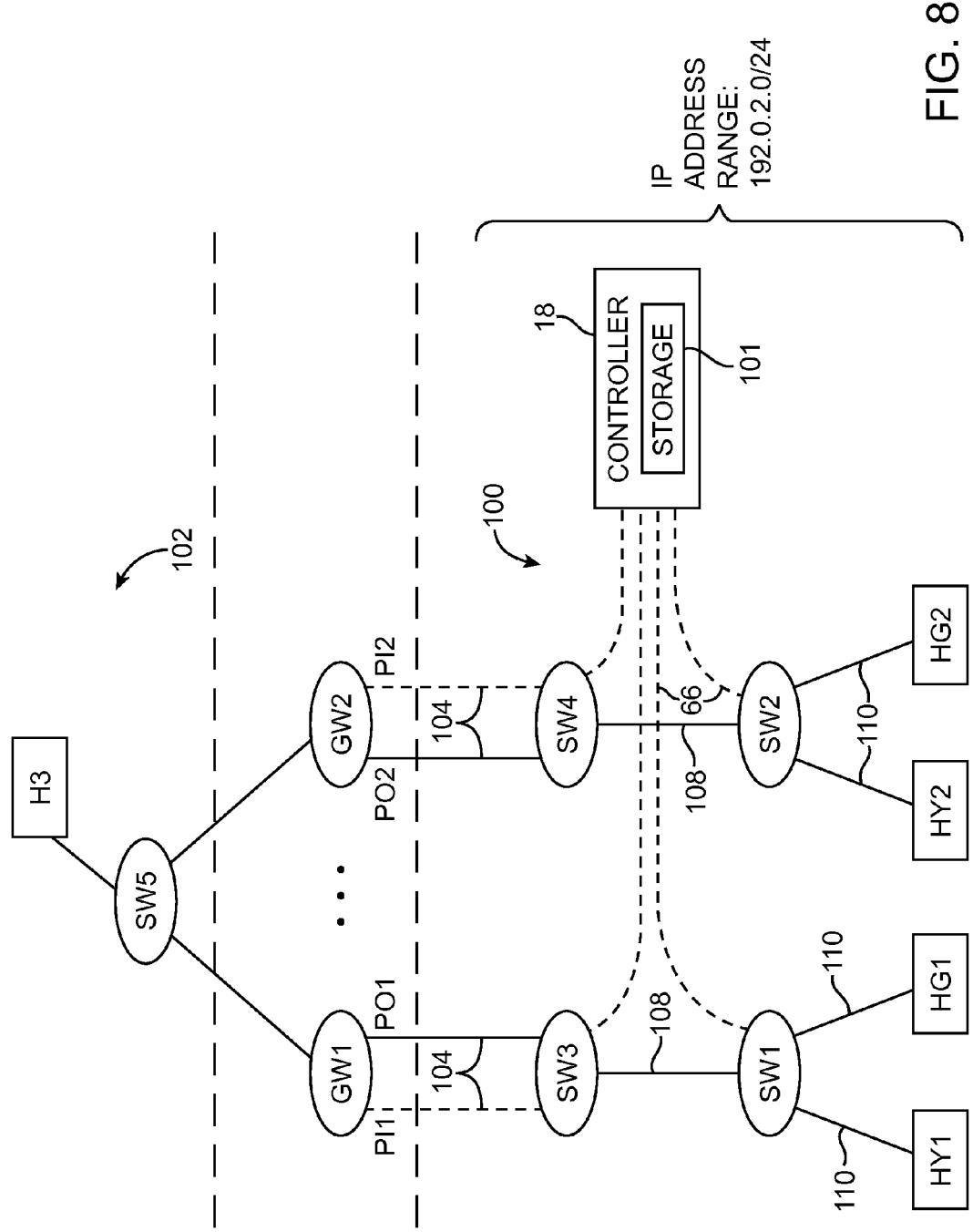
FIG. 8 is a diagram of an illustrative network that may interface with an external network via gateways in accordance with an embodiment of the present invention.

A controller (e.g., a controller server or other controllers implemented on computing equipment) may be used to control a network of switches. The controller may include one or more controller servers or may be distributed throughout one or more of the switches (e.g., portions of the controller may be implemented on storage and processing circuitry of multiple switches). FIG. 8 shows an illustrative network 100 with a controller 18 that controls switches (e.g., packet forwarding systems) in network 100. Controller 18 may include storage 101. Storage 101 may be used by controller 18 to store network information such as network topology information, network traffic information, end host information, or other network information gathered and/or maintained by controller 18. The network information may be stored as lists, databases, or other forms of storage such as graphs or trees.

As shown in FIG. 8, network 100 may include end hosts (e.g., end hosts HY1, HY2, HG1, and HG2) that are coupled to network switches in network 100 (e.g., switches SW1, SW2, SW3, and SW4). The switches may have ports to which end hosts or other switches may be coupled.

Switches such as switches SW1, SW2, SW3, and SW4 may include controller clients that are controlled by controller 18 via network paths 66 (sometimes referred to herein as network control paths). As an example, controller server 18 may control switch SW1 by providing flow table entries to switch SW1 over network paths 66. Switches that have controller clients may sometimes be referred to herein as client switches, because they are controlled by controller 18. If desired, network 100 may include switches that are not controlled by controller 18 (sometimes referred to as non-client switches). For example, network 100 may include zero or more non-client switches interposed between client switches or between client switches and end hosts.

Devices in network 100 may be associated with network protocol addresses selected from an assigned range of network protocol addresses. In the example of FIG. 8, network 100 may be assigned a range of Internet Protocol (IP) addresses such from 192.0.2.0 to 192.0.2.255. End hosts of network 100 may be assigned IP addresses within the IP address range of network 100. For example, end host HY1 may be assigned IP address 192.0.2.18, whereas end host HG1 may be assigned IP address 192.0.2.129. The IP addresses may be assigned to end hosts by users such as network administrators or using network protocols such as the Dynamic Host Configuration Protocol (DHCP).

IP address ranges may sometimes be referred to using an address and mask notation in which the mask indicates how many bits of the address have a fixed value for the IP address range. For example, network 100 having an IP address range of 192.0.2.0 to 192.0.2.255 may be referred to as having an IP address range of 192.0.2.0/24, because the first 24 bits of the IP address range are fixed (e.g., IP addresses of the IP address range have a predetermined prefix of 192.0.2).

Network 100 may be coupled to external networks such as network 102. External network 102 may be associated with IP addresses that are outside of the IP address range of network 100. For example, end host H3 of external network 102 may have an IP address that is smaller than 192.0.2.0 or greater than 192.0.2.255.

Networks such as network 100 and external network 102 may be coupled via gateway devices such as devices GW1 and GW2 that interface between the networks. The gateway devices may, for example, include routers, load-balancers, firewalls, or other network devices that interface between networks. If desired, the gateway devices may be configured to implement network policies that control network traffic between the networks. The network policies may be implemented by modifying network packets that are sent between the networks, redirecting the network packets, forwarding the network packets, or performing other actions on the network packets. The gateway devices may sometimes be referred to herein as gateways.

Network packets that are received by the gateway devices may include a time-to-live header field that stores a time-to-live value. For example, network packets that are sent using the Internet Protocol may include a time-to-live header field. The gateway devices may perform gateway functions such as decrementing the time-to-live header field of received network packets. The value stored in the time-to-live header field may determine how many times that the network packets can be processed by gateway devices (or other network devices that decrement the time-to-live header field of network packets). For example, gateway devices may be configured to drop network packets that have a time-to-live value of zero. In this scenario, a network packet having a time-to-live value of 32 may be processed up to 32 times by gateways (e.g., the network packet may traverse up to 32 gateways before the time-to-live value reaches zero and the network packet is dropped).

Gateways GW1 and GW2 may include gateway interfaces PO1 and PO2 that may be coupled to network 100 via network paths 104. If desired, gateways GW1 and GW2 may be coupled to network 100 via optional gateway interfaces PI1 and PI2. Client switches in network 100 may be coupled to other client switches via network paths 108. Client switches in network 100 may be coupled to end hosts via network paths 110. Networks paths 104, 108, and 110 may include non-client switches. For example, network path 104 between gateway GW1 and client switch SW3 may include non-client switches that are not controlled by controller 18. As another example, network path 110 between client switch SW1 and end host HY1 may include non-client switches.

Gateways GW1 and GW2 may interface between network 100 and external networks by forwarding network packets based on network protocol addresses such as IP addresses (e.g., because network 100 and external network 102 may be associated with respective IP address ranges). For example, switches in network 100 may be configured to forward network packets that are destined for end hosts outside of network 100 to gateway GW1. In this scenario, gateway GW1 may receive the network packets and forward the network packets to the destination end hosts based on destination IP address information retrieved from the network packets.

Figure 9:
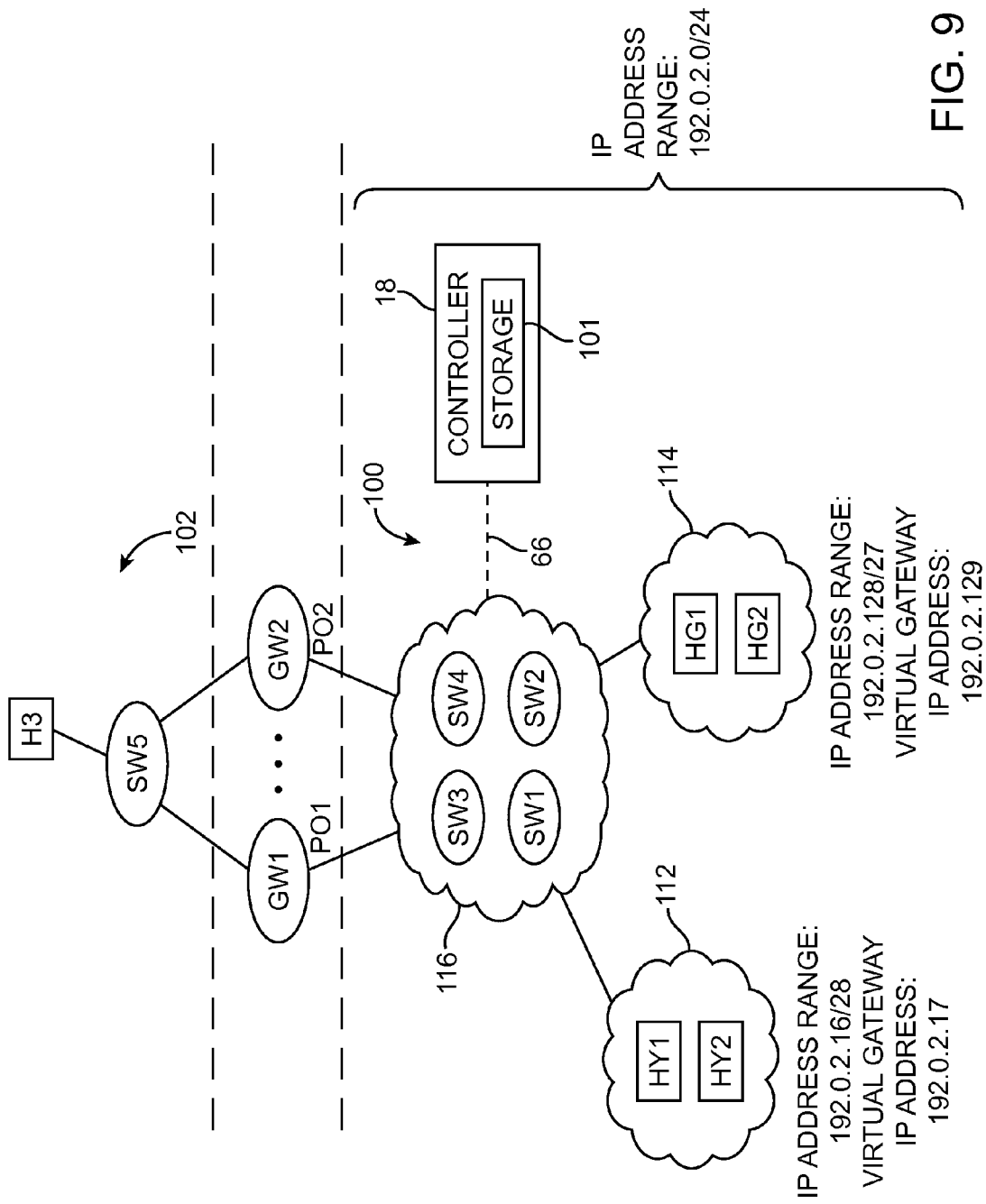
FIG. 9 is a diagram of an illustrative network partitioned into subnetworks by a controller in accordance with an embodiment of the present invention.

It may be desirable to form subnetworks within network 100 using controller 18. The subnetworks may be formed from respective portions of the network address range that corresponds to network 100. FIG. 9 is an illustrative diagram of network 100 partitioned into subnetworks 112 and 114. In the example of FIG. 9, subnetworks 112 and 114 may be formed from respective IP address ranges 192.0.2.16/28 and 192.0.2.128/27 (e.g., subnetwork 112 may be associated with IP addresses between 192.0.2.16 and 192.0.2.31, whereas subnetwork 114 may be associated with IP addresses between 192.0.2.128 and 192.0.2.159). End hosts of subnetworks such as subnetworks 112 and 114 may be assigned IP addresses within the corresponding IP address range. The subnetworks may sometimes be referred to as virtual switches that are associated with groups of end hosts. Each end host may be assigned an IP address within the IP address range of the corresponding group (subnetwork).

Each subnetwork may be assigned a gateway IP address that is provided to each end host of that subnetwork. The gateway IP address assigned to each subnetwork may sometimes be referred to as a default gateway IP address. For example, a user such as a network administrator may provide the gateway IP address to each end host of the subnetwork. As another example, the gateway IP address may be provided to each end host of the subnetwork via network protocols such as the Dynamic Host Configuration Protocol (DHCP). The gateway IP address provided to each end host may be used to determine which gateway (e.g., gateway GW1 or GW2) should be used to interface with external networks such as network 102. For example, if end host HY1 were to be provided with the IP address of gateway GW1, then end host HY1 may send network packets that are destined for external network 102 to gateway GW1.

Switches in network 100 such as client switches SW1, SW2, SW3, and SW4 may form a network fabric 116 that provides network forwarding paths between subnetworks and gateways. For example, network packets may be forwarded from end host HY1 of subnetwork 112 to gateway GW1 through a network forwarding path formed from client switches SW1 and SW3, whereas network packets from end host HY1 to gateway GW2 may be forwarded through a network forwarding path formed from client switches SW1, SW3, and SW4). The subnetworks may be coupled to multiple gateways (e.g., subnetwork 114 may be coupled to gateways GW1 and GW2 through network fabric 116). This example is merely illustrative. In general, each subnetwork may be coupled to one or more gateways for each external network that is coupled to that subnetwork.

It may be desirable to route network packets from different end hosts of a subnetwork to different gateways. For example, each end host of a given subnetwork may be located at different locations within network 100. A network forwarding path from end host HY1 to gateway GW2 through network fabric 116 includes three switches (e.g., switches SW1, SW3, and SW4), whereas a network forwarding path from end host HY1 to GW1 includes two switches (e.g., switches SW1 and SW3). In this scenario, it may be desirable to forward network packets from end host HY1 that are destined for external network 102 through gateway GW1, because the network forwarding path from end host HY1 to gateway GW1 may be shorter than the network forwarding path from end host HY1 to gateway GW2 (e.g., the network forwarding path to gateway GW1 may traverse fewer switches than the network forwarding path to gateway GW2). It may be desirable to select gateways for end hosts based on distances to the gateways, packet forwarding delay through the network forwarding paths, network traffic conditions, network policies (e.g., network policies that control which gateways are accessible by each end host), or other network information that may be maintained by controller 18.

Controller 18 may be used to control client switches in network 100 so that network packets sent from end hosts to external network 102 are forwarded through a desired gateway. Each subnetwork may be assigned a respective virtual gateway IP address (e.g., a reserved IP address that is not associated other network devices such as gateways GW1 and GW2 or end hosts). Each virtual gateway IP address may be a reserved address within the range of the corresponding subnetwork. In the example of FIG. 9, subnetwork 112 may be assigned a virtual gateway IP address of 192.0.2.17 (e.g., a reserved IP address within the IP address range 192.0.2.16/28) and subnetwork 114 may be assigned a virtual gateway IP address of 192.0.2.129 (e.g., a reserved IP address within the IP address range 192.0.2.128/27). This example is merely illustrative. Subnetworks 112 and 114 may be assigned any desired IP address that is reserved within the corresponding IP address ranges.

Figure 10:
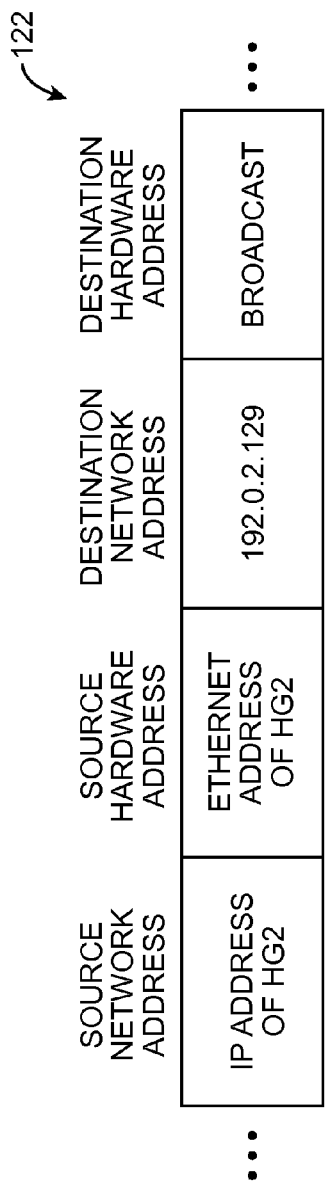
FIG. 10 is an illustrative Address Resolution Protocol (ARP) request that may be sent by an end host to obtain a reserved hardware address associated with a virtual gateway in accordance with an embodiment of the present invention.

Each end host of a given subnetwork may be configured with the virtual gateway IP address of that subnetwork. Each virtual gateway IP address may be assigned a corresponding virtual gateway hardware address (e.g., the virtual gateway IP address and virtual gateway hardware address may represent a virtual gateway). An end host may use the virtual gateway IP address to request additional information such as the virtual gateway hardware address. The end hosts may use network protocols such as the Address Resolution Protocol (ARP) to request the virtual gateway hardware address. FIG. 10 is an illustrative diagram of an ARP request packet 122 that may be sent by end host HG2 to request a virtual gateway hardware address using the virtual gateway IP address of subnetwork 114 (e.g., 192.0.2.129).

As shown by FIG. 10, ARP request packet 122 may include the IP address of end host HG2 stored in a source network address field, the Ethernet address of end host HG2 stored in a source hardware address field, the virtual gateway IP address of end host HG2 stored in a destination network address field, and a broadcast address stored in a destination hardware address field. The source address fields (e.g., the source hardware address field and the source network address field) may identify that end host HG2 sent the ARP request packet. The destination network address may identify the IP address for which hardware address information is being requested. The broadcast address may be a reserved Ethernet address such as 0xFFFFFF.

Figure 11:
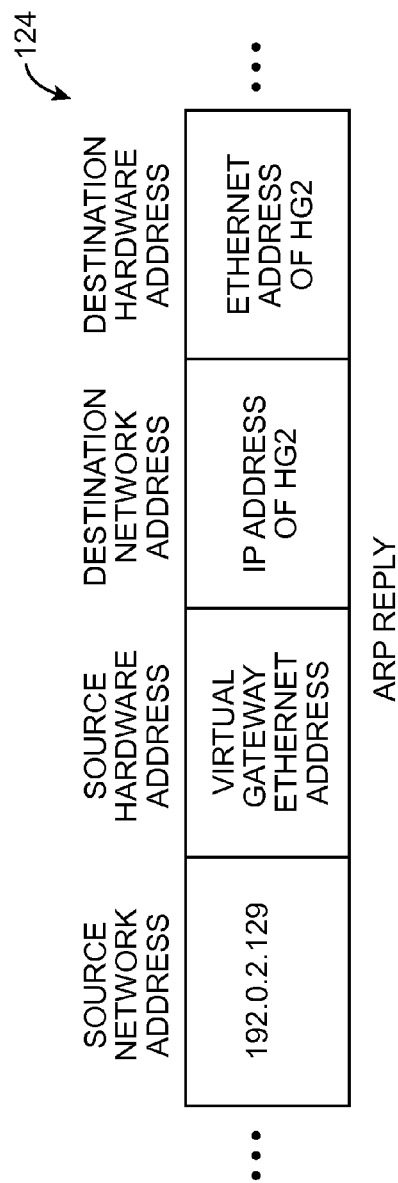
FIG. 11 is an illustrative Address Resolution Protocol reply that may be sent in response to an Address Resolution Protocol request in accordance with an embodiment of the present invention.

Controller 18 may control client switches in network 100 so that ARP requests for virtual gateway IP addresses are identified and processed by either controller 18 or the switches. For example, controller 18 may provide flow table entries to the client switches that match ARP request packets having a virtual gateway IP address in the destination network address field. In this scenario, the flow table entries may direct the switches to forward the matching ARP requests to the controller for processing (e.g., to generate appropriate ARP reply packets). Alternatively, the flow table entries may direct the switches to reply to the matching ARP requests with appropriate ARP reply packets. FIG. 11 is an illustrative diagram of an ARP reply packet 124 that may be sent to an end host in response to an ARP request packet such as ARP request packet 122.

As shown in FIG. 11, ARP reply packet 124 may include a source network address field, source hardware address field, destination network address field, and a destination hardware address field. The network and hardware addresses of the end host that sent the ARP request packet may be stored in the destination network address field and the destination hardware address field of ARP reply packet 124 (e.g., because the source end host of the ARP request packet is the destination end host of ARP Reply packet 124). The virtual gateway IP address from the original ARP request packet may be stored in the source network address field of ARP reply packet 124.

Controller 18 may store a reserved hardware address (e.g., a reserved Ethernet address) associated with the virtual gateway IP address in the source hardware address field of ARP reply packet 124 and send ARP reply packet 124 to the end host that sent the ARP request packet (e.g., the end host identified by the destination network address and destination hardware address fields of ARP reply packet 124). As an example, controller 18 may maintain a list or database of virtual gateway IP addresses and corresponding virtual gateway Ethernet addresses in storage 101. In this scenario, controller 18 may use the virtual gateway IP address of the ARP request packet to retrieve the corresponding virtual gateway Ethernet address from storage 101.

Controller 18 may send ARP reply packet 124 to the end host by sending ARP reply packet 124 to a client switch coupled to the end host and directing the client switch to forward ARP reply packet 124 to the end host. The hardware address of the virtual gateway may be used by the end host when sending network packets to external networks.

Figure 12:
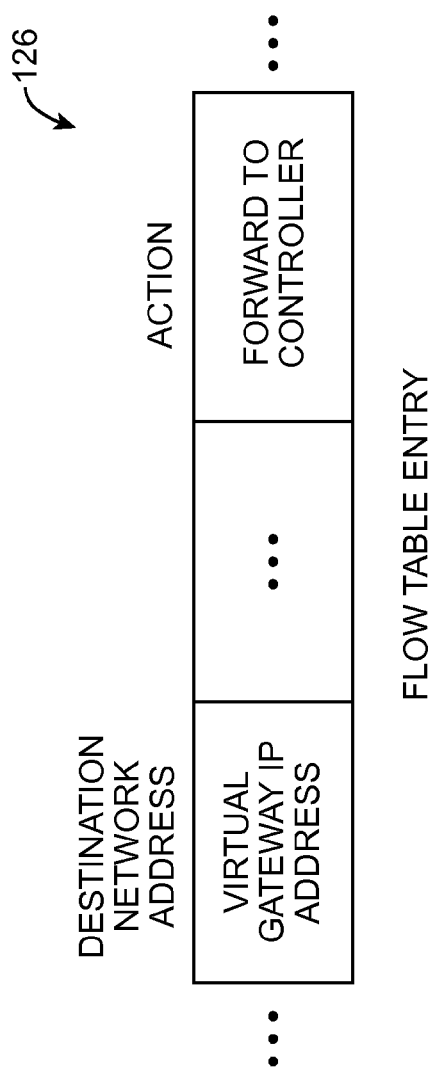
FIG. 12 is a diagram of an illustrative flow table entry that may be provided by a controller to direct switches to forward matching network packets to the controller in accordance with an embodiment of the present invention.

FIG. 12 is an illustrative diagram of a flow table entry 126 that may be provided by controller 18 to client switches (e.g., client switches SW1, SW2, etc.). Flow table entry 126 may direct the client switches to forward network packets such as ARP request packet 122 that include virtual gateway IP addresses to controller 18. As shown in FIG. 12, flow table entry 126 may match network packets that have a virtual gateway IP address stored in a destination network address field. Flow table entry 126 may direct switches that are provided with flow table entry 126 to forward the matching network packets to controller 18.

As an example, controller 18 may provide a flow table entry 126 having virtual gateway IP address 192.0.2.129 stored in the destination network address field to client switch SW2. In this scenario, the flow table entry may be used by client switch SW2 to identify network packets such as ARP request packet 122 that have virtual gateway IP address 192.0.2.129 stored in a destination network address field. The flow table entry may direct client switch SW2 to forward the identified network packets to controller 18 for processing. In response to receiving the identified network packets, controller 18 may control the client switches to respond with ARP reply packets such as ARP reply packet 124. The ARP reply packets may include a virtual gateway Ethernet address that corresponds to virtual gateway IP address 192.0.2.129.

Figure 13:
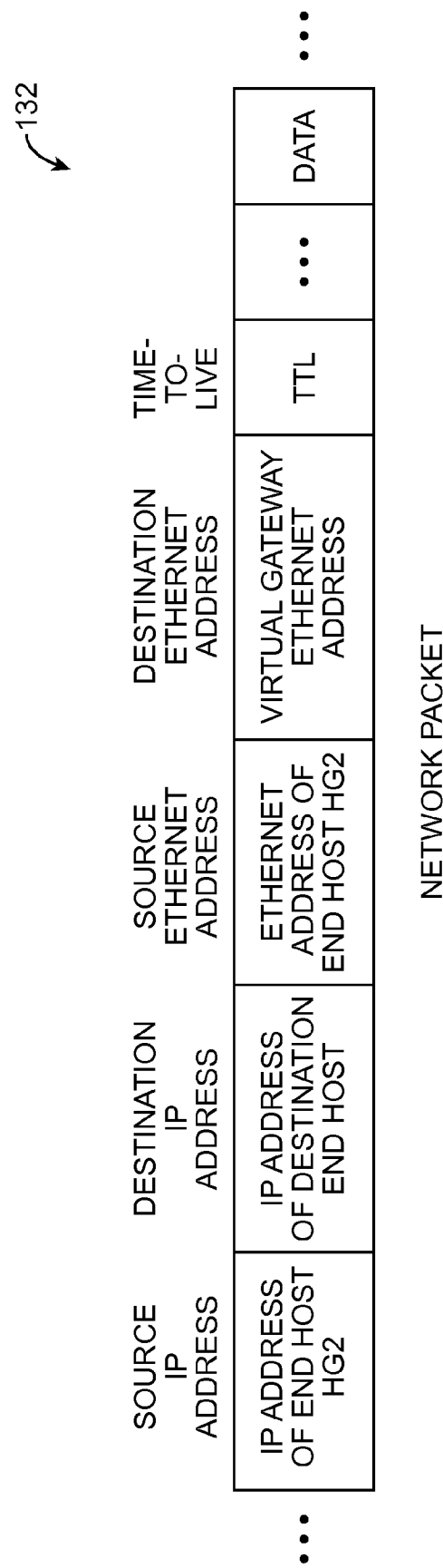
FIG. 13 is an illustrative network packet that may be sent by a source end host to a destination end host in an external network in accordance with an embodiment of the present invention.

An end host may send network packets that are destined for external networks (or external subnetworks) by forming the network packets with a virtual gateway Ethernet address (e.g., retrieved from the source hardware address field of an ARP reply packet) stored in a destination Ethernet address field of the network packets. FIG. 13 is an illustrative diagram of a network packet 132 that may be sent by end host HG2 to a destination end host of an external network.

As shown in FIG. 13, network packet 132 may include source and destination IP address fields, source and destination Ethernet address fields, a time-to-live header field, and data to be sent to the destination end host. Network packet 132 may include the Ethernet and IP addresses of end host HG2 stored in the source Ethernet address and source IP address fields and may include the IP address of the destination end host stored in the destination IP address field. Network packet 132 may include a virtual gateway Ethernet address stored in the destination Ethernet address field of network packet 132. The virtual gateway Ethernet address may, for example, have been provided in an ARP reply packet sent by controller 18 in response to an ARP request packet from the end host HG2.

Controller 18 may control client switches in network 100 to forward network packet 132 to a selected gateway by replacing the virtual gateway Ethernet address with the Ethernet address of a selected gateway, thereby redirecting network packet 132 to the selected gateway (e.g., because switches in network 100 may forward network packets based on Ethernet address fields). The selected gateway may receive network packet 132 and route the network packet to the destination end host based on the destination IP address field of network packet 132. The selected gateway may perform gateway functions when routing the network packet to the destination host. For example, the selected gateway may decrement the time-to-live header field and/or implement network policies.

Figure 14:
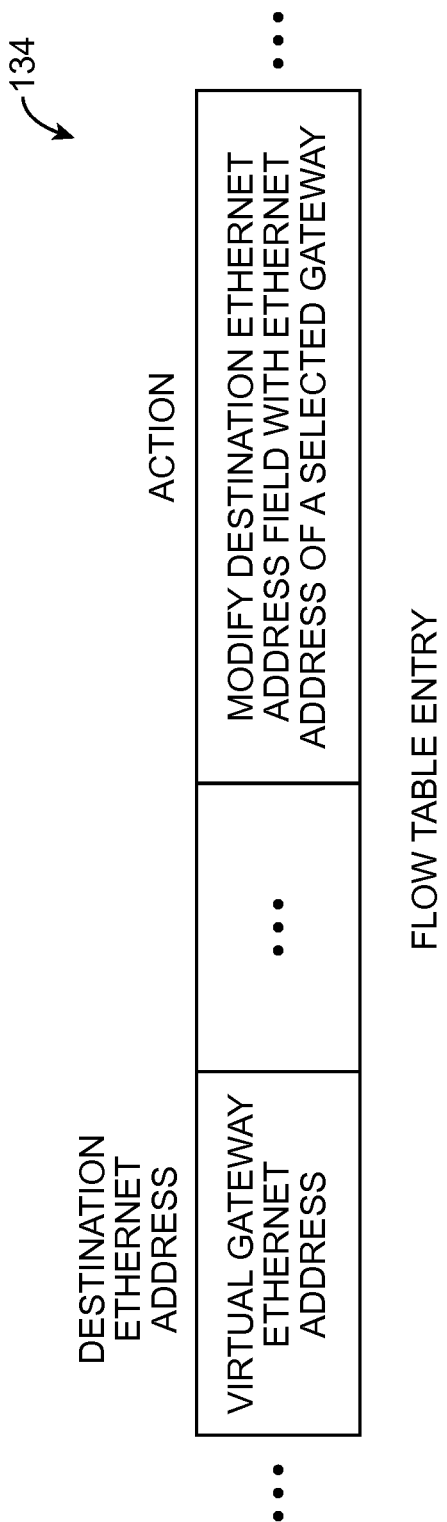
FIG. 14 is a diagram of an illustrative flow table entry that may be provided by a controller to redirect network packets to a selected gateway in accordance with an embodiment of the present invention.

FIG. 14 is a diagram of an illustrative flow table entry 134 that may be provided to client switches by controller 18 so that network packets are redirected to selected gateways. As shown in FIG. 14, flow table entry 134 may include a virtual gateway Ethernet address stored in a destination Ethernet address field. The client switches may use flow table entry 134 to identify network packets that have matching destination Ethernet address fields. The action field of flow table entry 134 may direct the client switches to modify the destination Ethernet address fields of the identified network packets with the Ethernet address of a selected gateway (e.g., a gateway selected by controller 18).

Controller 18 may provide flow table entry 134 to a client switch in response to a network packet received from the client switch. As an example, a client switch that receives a network packet that is destined for a virtual gateway Ethernet address may attempt to match the network packet with flow table entries that have been provided to the client switch. If the client switch is unable to identify a matching flow table entry, the client switch may forward the network packet to controller 18. In response to receiving the network packet, controller 18 may provide the client switch with flow table entry 134 and direct the client switch to forward the network packet based on flow table entry 134.

Figure 15:
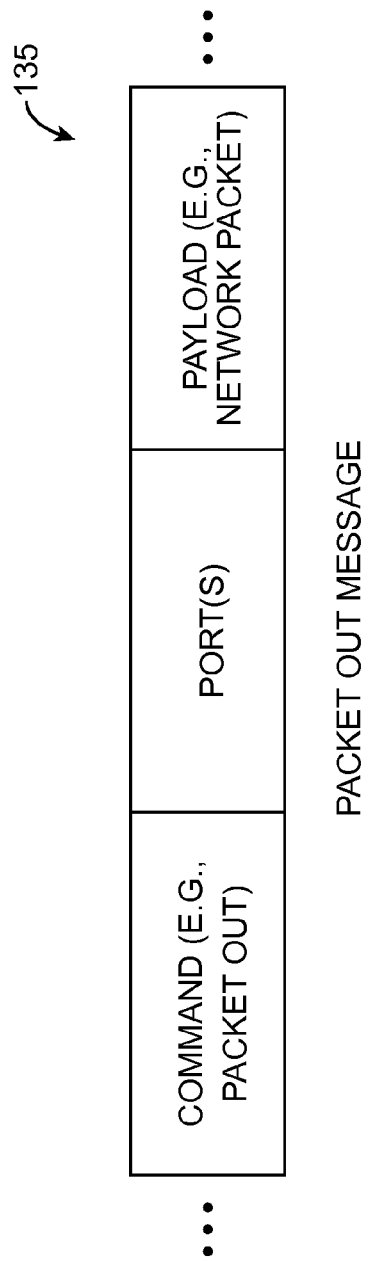
FIG. 15 is an illustrative packet out message that may be sent by a controller in accordance with an embodiment of the present invention.

Controller 18 may direct a client switch to forward a network packet by sending a control message to the client switch via control paths 66. FIG. 15 is an illustrative control message 135 that may be sent by controller 18 to direct a client switch to forward a network packet to an end host and/or another switch. Control message 135 may sometimes be referred to as a packet out message.

As shown in FIG. 15, packet out message 135 may include a command (e.g., a packet out command), one or more ports (e.g., a list of ports), and a payload. The command may direct the client switch to forward a network packet stored in the payload from the port(s) that are identified by packet out message 135. As an example, to direct client switch SW2 to forward a network packet to client switch SW4, controller 18 may send a packet out message 135 to switch SW2 (e.g., via control path 66) that includes a packet out command and the network packet and identifies a port of client switch SW2 that corresponds to network path 108. In this scenario, switch SW2 may receive the packet out message, retrieve the network packet from the payload of the packet out message, and forward the network packet from the specified port to client switch SW4.

Figure 16:
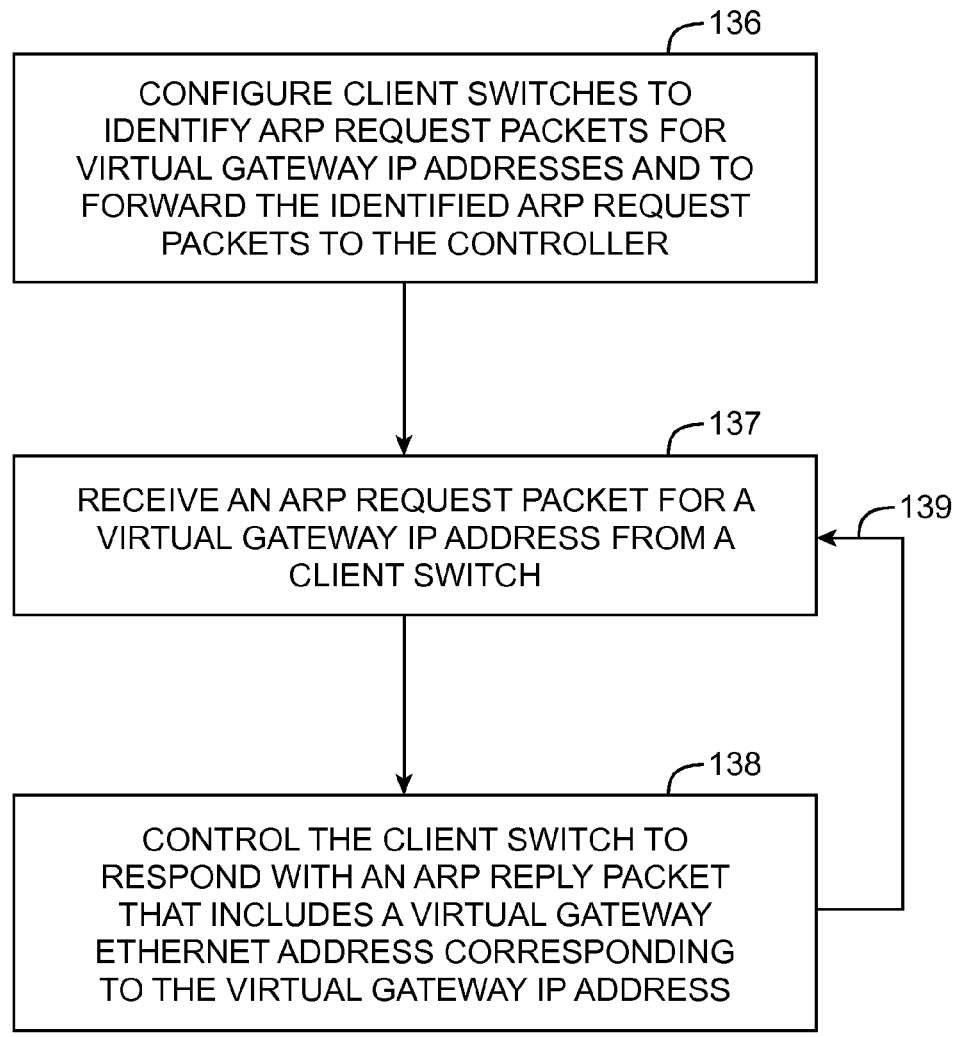
FIG. 16 is a flowchart of illustrative steps that may be performed by a controller to configure switches to respond to ARP requests in accordance with an embodiment of the present invention.

FIG. 16 is a flowchart of illustrative steps that may be performed by controller 18 to provide end hosts of network 100 with virtual gateway Ethernet addresses (e.g., reserved Ethernet addresses that may be used by the end hosts to send network packets to an external network such as external network 102).

In step 136, controller 18 may configure client switches in network 100 to identify ARP request packets for virtual gateway IP addresses (e.g., ARP request packets having virtual gateway IP addresses stored in destination network address fields) and to forward the identified ARP request packets to controller 18. For example, controller 18 may provide the client switches with flow table entry 126 that directs the client switches to forward matching ARP request packets to controller 18.

In step 137, controller 18 may receive an ARP request packet for a virtual gateway IP address from a client switch. The ARP request packet may, for example, have been sent by an end host to request the Ethernet address that corresponds to the virtual gateway IP address.

Controller 18 may use information retrieved from the received ARP request packet to determine which gateway should be assigned to the end host from which the ARP request packet was received. For example, controller 18 may use source information such as source address information retrieved from the source network address and source hardware address fields of the ARP request packet to identify that end host HG2 sent the ARP request packet. In this scenario, controller 18 may determine that gateway GW2 should be assigned to end host HG2 (e.g., because a network forwarding path between gateway GW2 and end host HG2 may include fewer switches in comparison to a network forwarding path between gateway GW1 and end host HG2).

The example above in which controller 18 selects an appropriate gateway based network forwarding path distances between end host HG2 and gateways (e.g., gateways GW1 and GW2) is merely illustrative. Controller 18 may select a gateway based on any desired factors such as network topology information, network traffic conditions, network policies, etc. As an example, controller 18 may select gateways based on forwarding delay through network forwarding paths between end hosts and gateways. As another example, controller 18 may select a gateway based on network traffic conditions associated with the network forwarding paths (e.g., to help evenly distribute network traffic amongst the switches of network 100).

In step 138, controller 18 may control the client switch to respond to the ARP request packet with an ARP reply packet. The ARP reply packet may include the virtual gateway Ethernet address that corresponds to the virtual gateway IP address of the ARP request packet. As an example, controller 18 may send a packet out message that includes the ARP reply packet (e.g., as a payload) to the client switch. In this scenario, the packet out message may direct the client switch to send the ARP reply packet to the end host from which the ARP request packet was received (e.g., via an appropriate port of the client switch).

Figure 17:
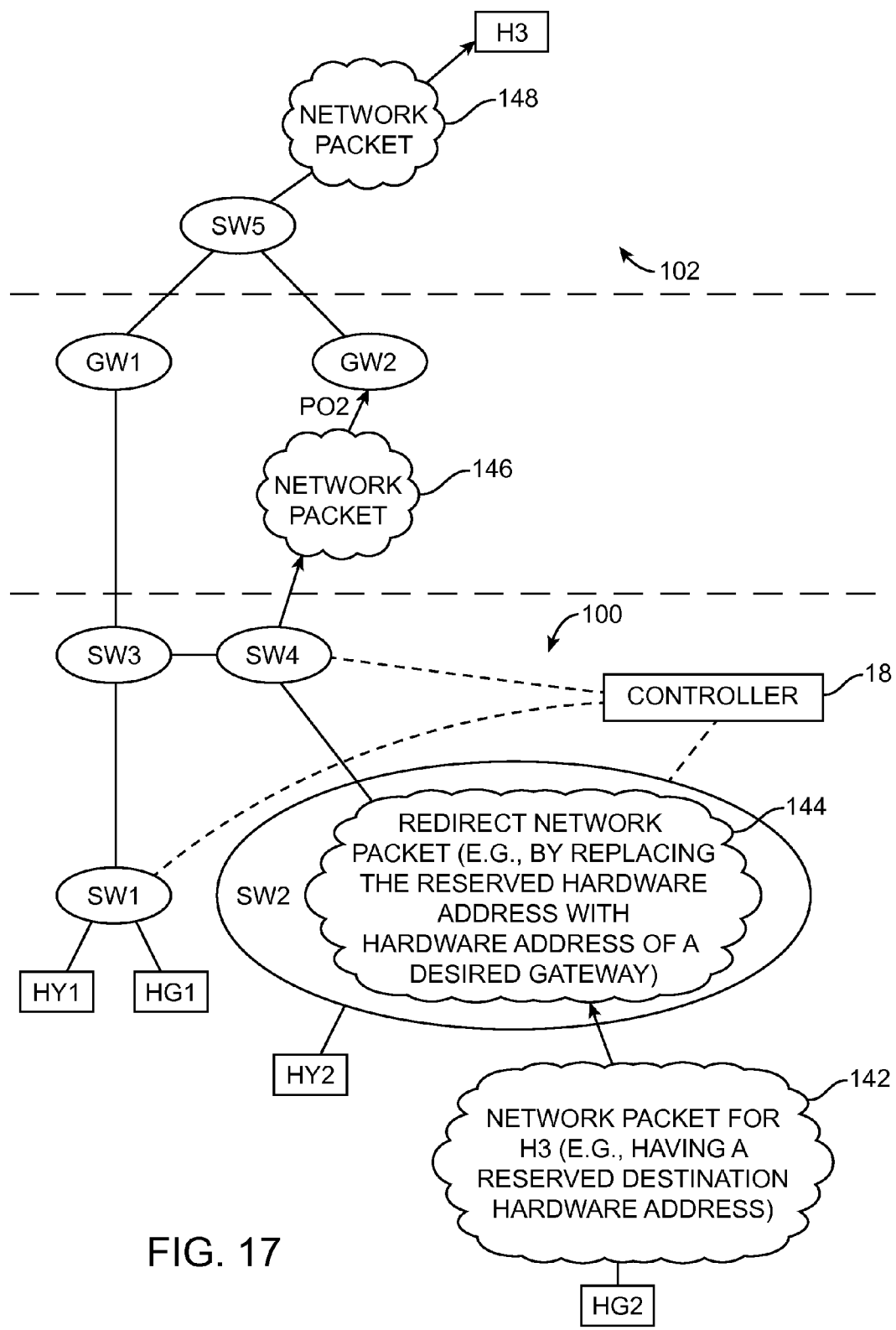
FIG. 17 is a diagram of illustrative steps that may be performed so that network packets are forwarded to an external network through a selected gateway in accordance with an embodiment of the present invention.

FIG. 17 is a diagram of illustrative steps that may be performed to send a network packet from end host HG2 to end host H3 (e.g., to an end host of an external network such as network 102).

In step 142, end host HG2 may send a network packet destined for end host H3. The network packet may include the IP address of end host H3 in a destination IP address field and a reserved hardware address in a destination Ethernet address field (e.g., a virtual gateway Ethernet address reserved for subnetwork 114). The reserved hardware address may have been provided to end host HG2 by controller 18 via an ARP reply packet. As an example, end host HG2 may send network packet 132 of FIG. 13 with the IP address of end host H3 stored in the destination IP address field and the virtual gateway Ethernet address of subnetwork 114 stored in the destination Ethernet address field.

In step 144, client switch SW2 may receive the network packet from end host HG2. Controller 18 may control client switch SW2 so that the network packet is redirected to a desired gateway. For example, client switch SW2 may attempt to match the network packet to flow table entries that have been provided to client switch SW2 by controller 18 (e.g., flow table entries such as flow table entry 134 of FIG. 14). If client switch SW2 is unable to identify a matching flow table entry, client switch SW2 may forward the network packet to controller 18. In response to receiving the network packet, controller 18 may identify an appropriate gateway for the network packet based on network information such as network topology information and information such as destination and/or source information retrieved from the network packet. In the example of FIG. 8, controller 18 may identify that the network packet from end host HG2 should be forwarded to gateway GW2 (e.g., because gateway GW2 is closer to end host HG2 than gateway GW1).

Controller 18 may provide client switch SW2 with a flow table entry such as flow table entry 134 of FIG. 14 that directs client switch SW2 to redirect network packets to gateway GW2 (e.g., a selected gateway). The network packets may be redirected to an interface of gateway GW2 that is coupled to network 100.

As an example, controller 18 may provide a flow table entry 134 that matches network packets that have the virtual gateway Ethernet address of the network packet that was received from end host HG2. In this scenario, the flow table entry may direct client switch SW2 to modify the destination Ethernet address field of matching network packets with the Ethernet address of interface PO2 of gateway GW2, thereby redirecting the matching network packet to gateway GW2. The flow table entry may be used by client switch SW2 to redirect future network packets that are destined for the virtual gateway Ethernet address to gateway GW2 (e.g., the identified gateway).

After providing client switch SW2 with the flow table entry, controller 18 may direct client switch SW2 to forward the network packet received from end host HG2 to gateway GW2. For example, controller 18 may send a control message such as packet out message 135 of FIG. 15 to client switch SW2. In this scenario, the control message may include the network packet received from end host HG2 and may direct client switch SW2 to forward the network packet from a port that is coupled to gateway GW2 (e.g., a port coupled to gateway GW2 through network path 108, client switch SW4, and network path 104).

In step 146, the network packet from end host HG2 may be forwarded by switches in network 100 to interface PO2 of gateway GW2 based on the destination Ethernet address field of the network packet (e.g., because the Ethernet address of interface PO2 may be stored in the destination Ethernet address field of the network packet). Gateway GW2 may receive the network packet and route the network packet to end host H3 based on the destination IP address field of the network packet (e.g., because the IP address of end host H3 may be stored in the destination IP address field of the network packet). For example, gateway GW2 may use the IP address of end host H3 to determine the Ethernet address of end host H3 (e.g., using the ARP protocol) and store the Ethernet address of end host H3 in the destination Ethernet address field of the network packet.

In step 148, gateway GW2 may send the network packet to end host H3 through external network 102. Gateway GW2 may perform gateway functions such as decrementing the time-to-live header field of the network packet when sending the network packet to end host H3. The network packet may be forwarded to end host H3 by switches in external network 102 using the destination Ethernet address field of the network packet, because the Ethernet address of end host H3 may be stored in the destination Ethernet address field.

Figure 18:
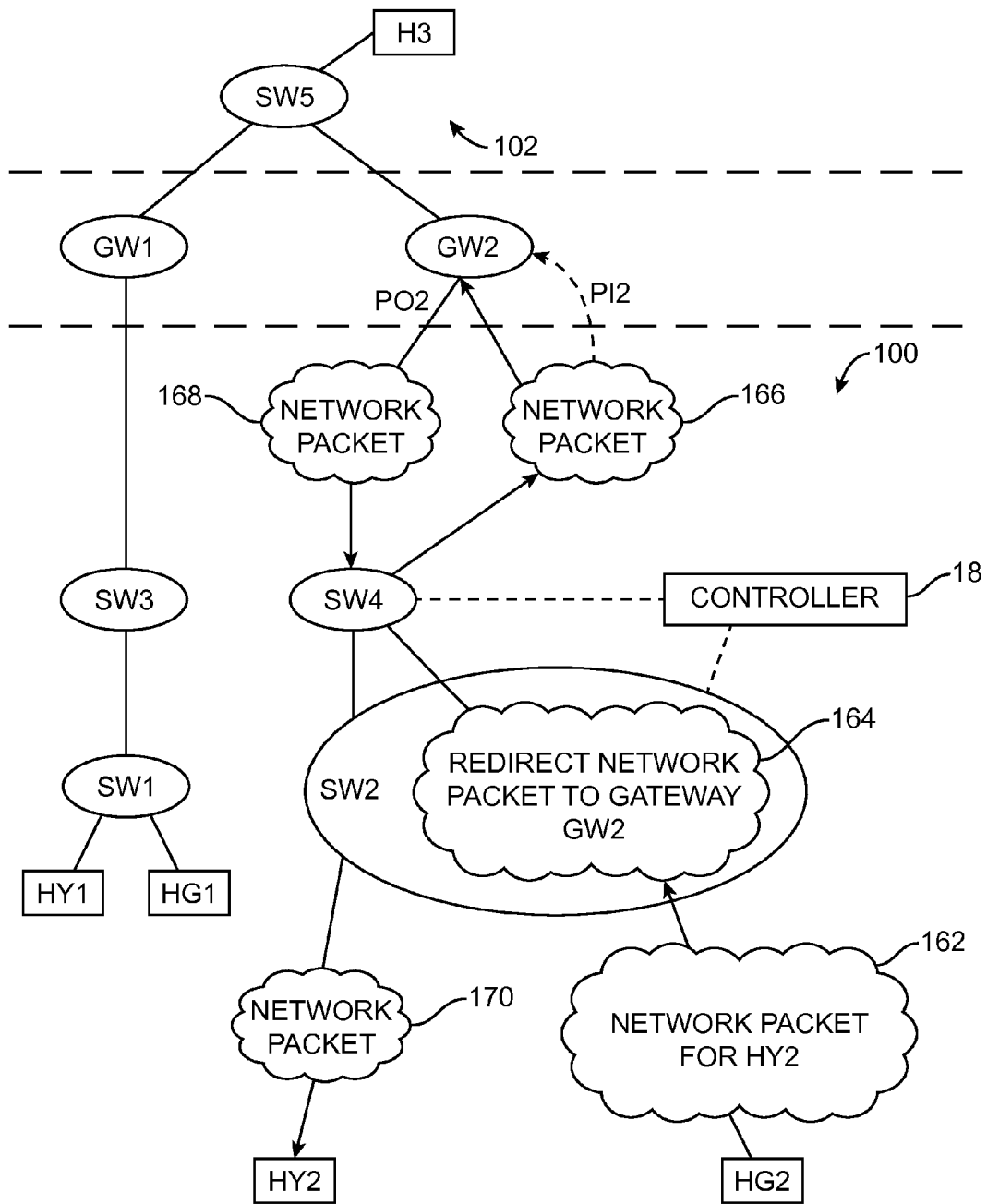
FIG. 18 is a diagram of illustrative steps that may be performed so that network packets are forwarded from a first subnetwork to a second subnetwork through a selected gateway in accordance with an embodiment of the present invention.

Controller 18 may route network packets between end hosts of different subnetworks through selected gateways. By routing the network packets through the selected gateways, controller 18 may use the gateways to perform gateway functions such as decrementing time-to-live header fields of the network packets. It may be desirable to use the gateways to perform gateway functions on network packets between different subnetworks in scenarios such as when client switches in network 100 lack the capability of performing the gateway functions. FIG. 18 is a diagram of illustrative steps that may be performed to route network packets between end hosts of different subnetworks through a selected gateway.

In step 162, end host HG2 may send a network packet that is destined for end host HY2. For example, end host HG2 may send network packet 132 with the IP address of end host HY2 stored in the destination IP address field of network packet 132 and with a virtual gateway Ethernet address field stored in the destination Ethernet address field.

In step 164, client switch SW2 may receive the network packet from end host HG2. Controller 18 may control client switch SW2 so that the network packet is redirected to gateway GW2 (e.g., a gateway selected based on network topology information, network traffic information, or other information maintained by controller 18).

In some scenarios, it may be desirable to forward the network packet to an interface of gateway GW2 that is different from the interface associated with network traffic sent from gateway GW2 to network 100. For example, gateway GW2 may perform the Internet Control Message Protocol (ICMP) redirect function in which the gateways generate ICMP redirect messages when network packets received at a given interface are routed by the gateway from the same given interface.

In this scenario, it may be desirable to forward the network packet from end host HG2 to optional interface PI2 of gateway GW2, thereby avoiding excessive processing load at the gateway (e.g., so that gateway GW2 does not generate ICMP redirect messages in response to network packets between subnetworks of network 100).

In scenarios in which gateway GW2 does not perform the ICMP redirect function (e.g., when the ICMP redirect function is disabled), it may be desirable to forward the network packet to interface PO2 (e.g., the interface from which gateway GW2 forwards network packets that are destined for network 100).

In step 166, the network packet may be forwarded to gateway GW2 (e.g., to interface PO2 or interface PI2 of gateway GW2) through switches such as client switch SW4. In step 168, the network packet may be processed by gateway GW2 and forwarded from interface PO2. In step 170, the network packet may be forwarded to end host HY2 through switches such as client switches SW4 and SW2.

In some scenarios, it may be desirable to use controller 18 to configure client switches in network 100 to perform gateway functions. For example, if client switches in network 100 have the capability of performing gateway functions such as decrementing time-to-live header fields of network packets, it may be desirable to use controller 18 to configure client switches in network 100 to perform gateway functions when forwarding network packets between subnetworks of network 100. FIG. 19 is an illustrative diagram of a flow table entry 181 that may be provided by controller 18 to client switches for performing gateway functions.

As shown in FIG. 19, flow table entry 181 may include an IP address of a destination end host stored in a destination IP address field and a virtual gateway Ethernet address stored in a destination Ethernet address field. Flow table entry 181 may control client switches to redirect network packets that have matching destination IP address and Ethernet address fields to the destination end host.

As an example, flow table entry 181 may direct the client switches to replace the virtual gateway Ethernet address with the Ethernet address of the destination end host (e.g., so that switches in network 100 forward the network packet to the destination end host). Flow table entry 181 may additionally direct client switches to perform gateway functions when redirecting network packets that match flow table entry 181. For example, flow table entry 181 may direct the client switches to decrement a time-to-live header field of the network packets.

Figure 20:
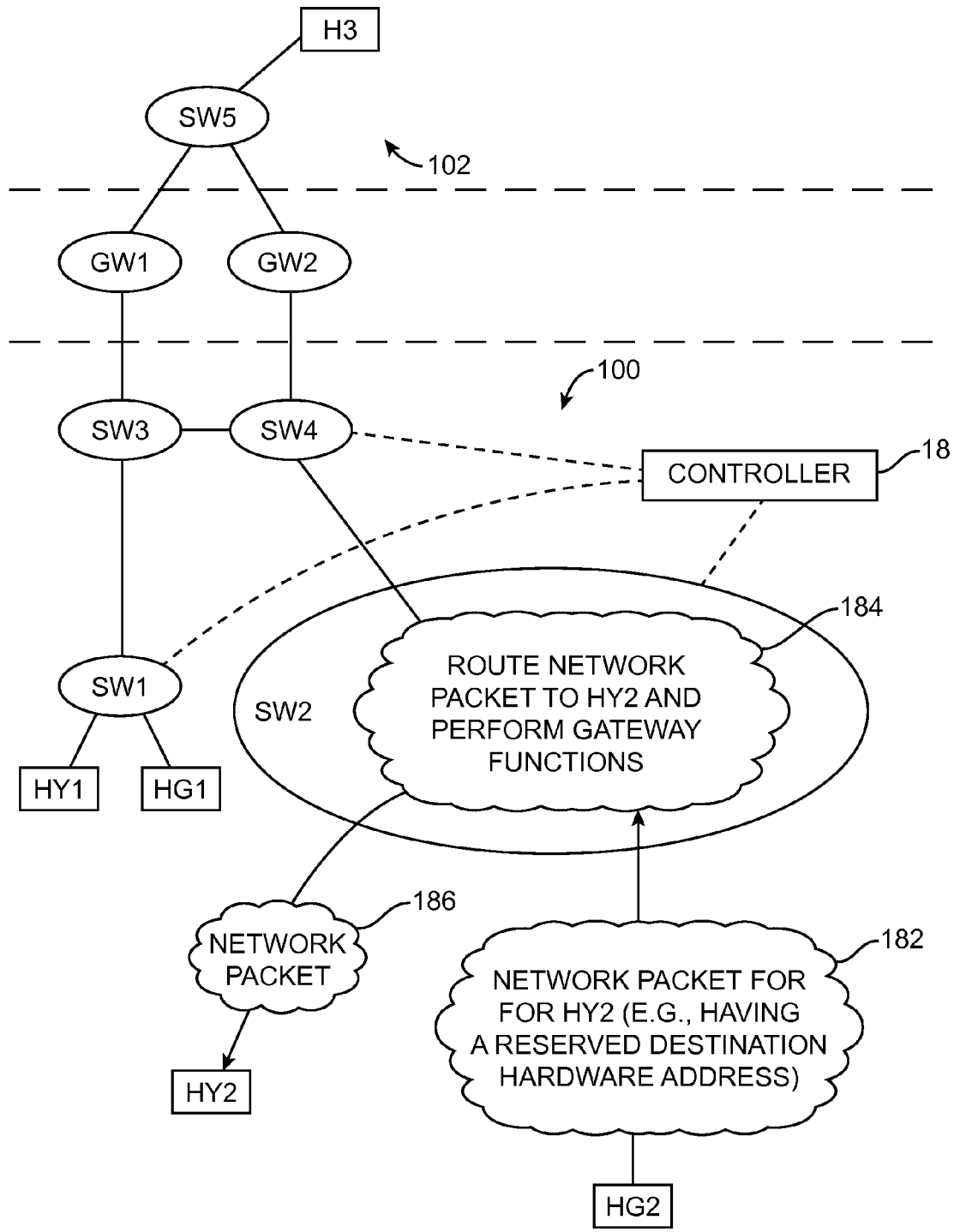
FIG. 20 is a diagram of illustrative steps that may be performed so that switches controlled by a controller perform gateway functions in accordance with an embodiment of the present invention.

FIG. 20 is a diagram of illustrative steps that may be performed when a network packet is forwarded between different subnetworks by client switches that are capable of performing gateway functions.

In step 182, a network packet may be sent by end host HG2 (e.g., an end host of a first subnetwork 114) to end host HY2 (e.g., an end host of a second subnetwork 112). The operations of step 182 may be substantially similar to step 162 of FIG. 18.

In step 184, client switch SW2 may receive and process the network packet. Client switch SW2 may be controlled by controller 18 to route the network packet to end host HY2 and perform gateway functions on the network packet. For example, client switch SW2 may use flow table entries such as flow table entry 181 that have been provided by controller 18 to determine how to process the network packet.

In scenarios in which client switch SW2 is unable to identify a flow table entry that matches the network packet, client switch SW2 may forward the network packet to controller 18. In response to receiving the network packet, controller 18 may retrieve information such as source and destination information from the network packet and use the retrieved information along with network topology information to provide client switch SW2 with an appropriate flow table entry (e.g., flow table entry 181).

As an example, controller 18 may retrieve source address information and destination address information from the network packet and use the retrieved address information to identify source and destination end hosts of the network packet. In this scenario, controller 18 may use network topology information to determine a network forwarding path between the source and destination end hosts. The network topology information may include information describing the network connections and/or network paths between client switches and between client switches and end hosts of network 100. Controller 18 may provide client switches in network 100 with flow table entries so that the network packet is forwarded from the source end host (e.g., end host HG2) to the destination end host (e.g., end host HY2) along the network forwarding path and so that gateway functions are performed on the network packet.

By controlling client switches in network 100 to perform gateway functions and to route network packets between subnetworks of network 100, controller 18 may configure a network fabric formed from the client switches of network 100 (e.g., network fabric 116 of FIG. 9) to operate as a virtual gateway that interfaces between subnetworks 112, 114, and external networks such as network 102.

Figure 21:
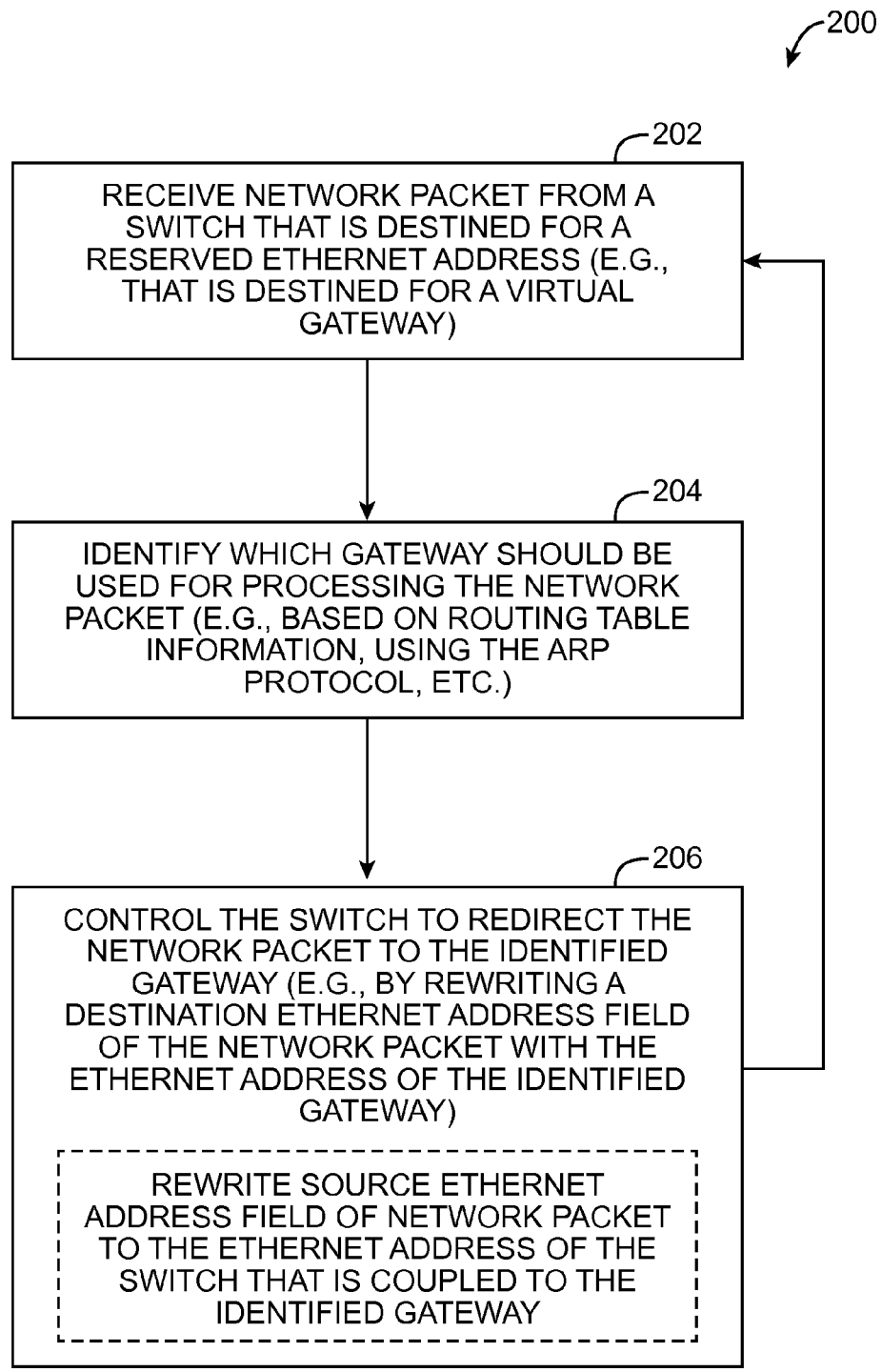
FIG. 21 is a flowchart of illustrative steps that may be performed by a controller to configure switches so that network packets are forwarded to selected gateways in accordance with an embodiment of the present invention.

Controller 18 may perform steps for controlling client switches of network 100 to forward network packets to external networks through desired gateways. FIG. 21 is a flowchart 200 of illustrative steps that may be performed by controller 18 to control the client switches. The steps of flowchart 200 may, for example, be performed during step 144 of FIG. 17 and step 164 of FIG. 18 to redirect network packets to a selected gateway (e.g., gateway GW2).

In step 202, controller 18 may receive a network packet from a switch (e.g., a client switch). The network packet may be sent by an end host to a reserved Ethernet address (e.g., a virtual gateway Ethernet address). The reserved Ethernet address may identify that the network packet is destined for a network or subnetwork that is external to the subnetwork of the end host. In other words, the reserved Ethernet address may identify that the network packet should be processed by a gateway.

In step 204, controller 18 may select a gateway that should be used for processing the network packet. The gateway may be selected based on routing table information, using the ARP protocol, based on network topology, and/or information retrieved from the network packet. If desired, the gateway may be selected based on other network information that is maintained by the controller (e.g., network information gathered from the client switches via control paths 66).

As an example, the controller may retrieve the IP address of the destination end host from the network packet. In this scenario, the controller may select a gateway using a routing or forwarding table that identifies which IP address ranges are associated with each gateway. The controller may request an Ethernet address of the selected gateway by sending an ARP request packet for an IP address of the selected gateway (e.g., an IP address retrieved from a forwarding table). If desired, the controller may determine which gateway is selected based on how many switches are coupled between each gateway and the end host that sent the network packet (e.g., to reduce network load associated with forwarding the network packet to the selected gateway).

In step 206, controller 18 may control the switch to redirect the network packet to the selected (identified) gateway. The network packet may be redirected by flow table entries such as flow table entry 134 of FIG. 14 that were previously provided to the client switches by controller 18. Alternatively, the controller may redirect the network packet by providing a flow table entry such as flow table entry 134 to the client switch that forwarded the network packet to the controller and subsequently sending a packet out message to the client switch (e.g., a packet out message that includes the network packet).

If desired, controller 18 may control the switch to redirect the network packet to a reserved interface of the selected gateway. For example, if the selected gateway performs ICMP redirect functions, then controller 18 may redirect the network packet to an interface of the selected gateway that is reserved for network traffic from the network of the controller to the selected gateway (e.g., so that ICMP redirect messages are not generated by the gateway in response to receiving the network packet).

Optionally, the operations of step 208 may be performed during step 206. In optional step 208, controller 18 may direct the client switch to rewrite the source Ethernet address field of the network packet to the Ethernet address of a network switch that is coupled to the selected gateway. For example, controller 18 may include instructions in the action field of flow table entry 134 that direct the client switch to store the Ethernet address of client switch SW4 in the source Ethernet address field of the network packet. The operations of step 208 may, for example, be performed by controller 18 so that network 100 appears to gateway GW2 as a single entity represented by client switch SW4.

Figure 22:
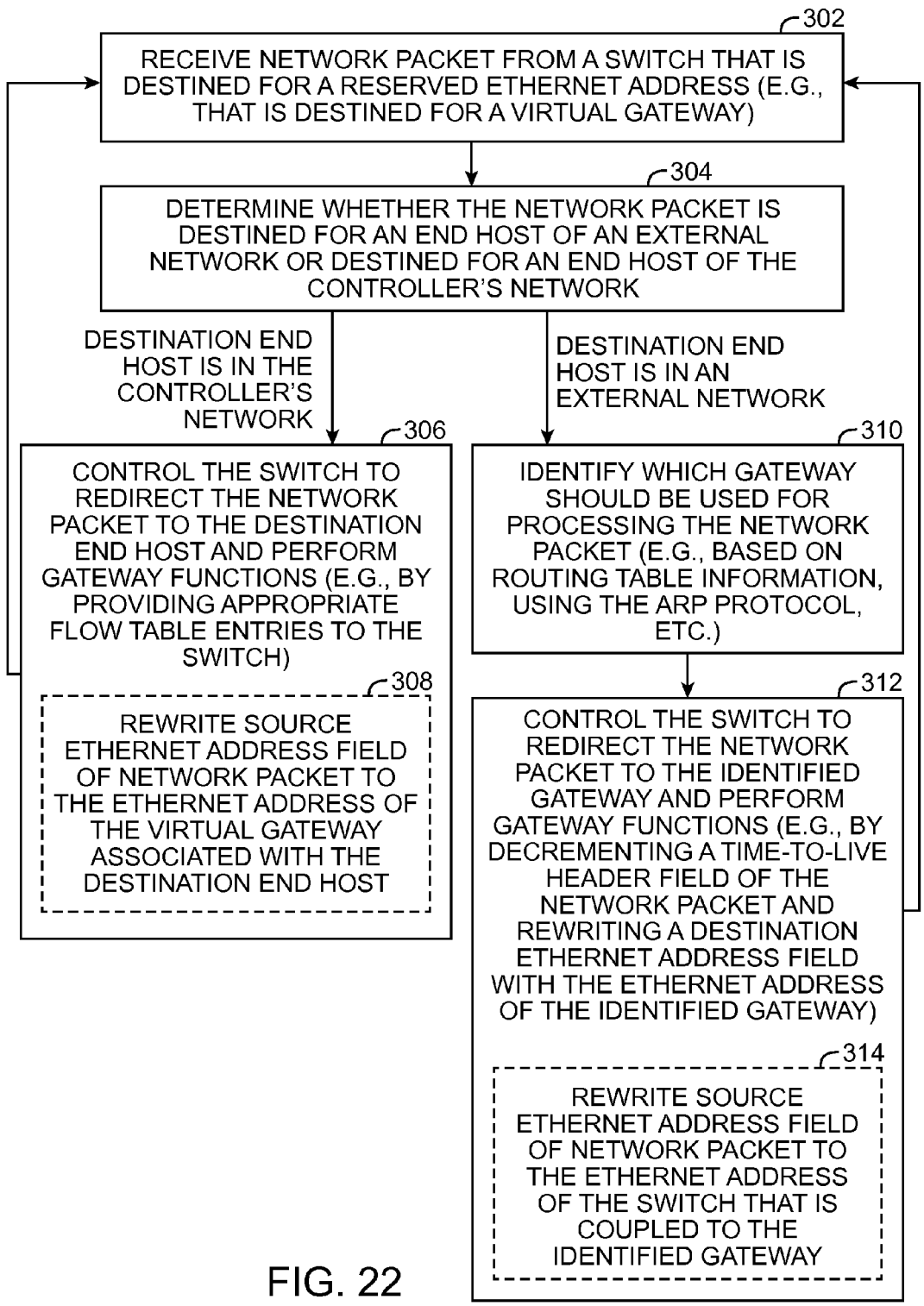
FIG. 22 is a flowchart of illustrative steps that may be performed by a controller to configure switches to perform gateway functions in accordance with an embodiment of the present invention.

Controller 18 may perform steps to control client switches in network 100 to perform gateway functions. FIG. 22 is a flowchart of illustrative steps that may be performed by controller 18 to control the client switches to perform gateway functions.

In step 302, controller 18 may receive a network packet from a switch (e.g., a client switch). The network packet may be destined for a reserved Ethernet address (e.g., a virtual gateway Ethernet address).

In step 304, controller 18 may determine whether the network packet is destined for an end host of an external network of destined for an end host of the controller's network (e.g., the network having client switches that are controlled by the controller). For example, controller 18 may retrieve destination IP address information from the network packet and compare the destination IP address information to information maintained by controller 18 that identifies which IP address ranges are associated with each network. If the destination end host is in the controller's network (e.g., if the destination IP address of the network packet lies within the IP address range of the controller's network), the operations of step 306 may be performed. If the destination end host is in an external network (e.g., if the destination IP address of the network packet is outside of the IP address range of the controller's network), the operations of step 310 may be performed.

In step 306, controller 18 may control the switch to redirect the network packet to the destination end host and perform gateway functions. For example, controller 18 may provide a flow table entry to the switch that directs the switch to decrement a time-to-live header field of the network packet and to store the Ethernet address of the destination end host in the destination Ethernet address field of the network packet.

Optionally, during step 306, the operations of step 308 may be performed to rewrite a source Ethernet address field of the network packet to the Ethernet address of the virtual gateway associated with the destination end host (e.g., the virtual gateway Ethernet address of the virtual gateway associated with the subnetwork of the destination end host). By performing the operations of step 306, controller 18 may control the switches so that network 100 operates as if gateway devices interface between subnetworks of network 100.

In step 310, controller 18 may identify which gateway should be used for processing the network packet (e.g., because the destination end host is in an external network). The gateway may be identified based on routing table information, using the ARP protocol, network topology information, etc.

In step 312, controller 18 may control the switch to redirect the network packet to the selected (identified) gateway and to perform gateway functions. Optionally, during step 312, the operations of step 314 may be performed to rewrite the source Ethernet address field of the network packet to the Ethernet address of the switch that is coupled to the identified gateway (e.g., so that network 100 appears to external gateway devices as if a gateway device is interposed between the external gateway devices and end hosts of network 100).

Figure 23:
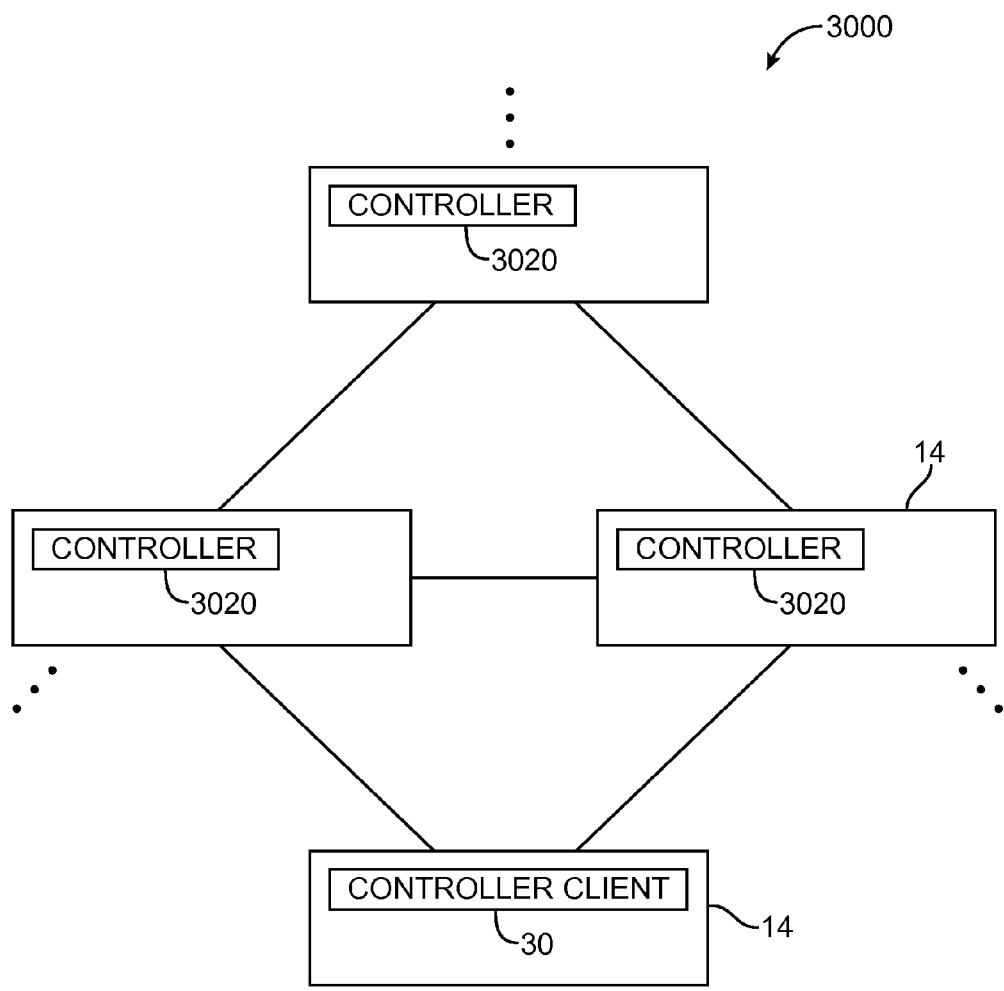
FIG. 23 is a diagram of an illustrative network in which a controller may be distributed throughout switches in the network in accordance with an embodiment of the present invention.

Controllers such as controller 18 may be formed as centralized controllers or distributed controllers. FIG. 23 shows an illustrative example in which controllers 3020 may be distributed on switches 14 throughout network 3000. Controllers 3020 may be distributed on some or all of network switches 14. Controller clients such as controller client 30 may communicate with one or more of controllers 3020 via network communications links (e.g., controllers 3020 may send instructions to controller client 30 via the communications links). Controllers 3020 may communicate with each other to collectively control switches 14 or may individually control switches 14. As an example, controllers 3020 may collectively control network 3000 by communicating with each other. Controllers 3020 may share information relating to network topology, network traffic, end hosts that are coupled to switches 14, etc.

The foregoing is merely illustrative of the principles of this invention and various modifications can be made by those skilled in the art without departing from the scope and spirit of the invention.

What is claimed is:

1. A method of using a controller to control switches in a network having end hosts that are coupled to the switches, wherein the controller is coupled to the switches via network control paths, and wherein the network is coupled to a plurality of gateways that interface between the network and an external network, the method comprising:
  receiving a network packet, from a given switch based on a flow table entry, that is destined for the external network at the controller, wherein the network packet includes a reserved network address associated with a virtual gateway Internet Protocol (IP) address;
  with the controller, dynamically selecting a gateway from the plurality of gateways;
  the controller providing the given switch with the flow table entry that identifies a reserved hardware address; and
  with the controller, directing the switches to forward the network packet to the external network through the selected gateway, wherein the flow table entry directs the given switch to modify the reserved hardware address in a destination Ethernet address field of the network packet with an Ethernet address of the selected gateway.

2. The method defined in claim 1 further comprising:
  with the controller, retrieving information from the network packet, wherein selecting the gateway from the plurality of gateways comprises selecting the gateway from the plurality of gateways based on the information retrieved from the network packet.

3. The method defined in claim 2, wherein retrieving information from the network packet comprises retrieving source address information from header fields of the network packet.

4. The method defined in claim 3, wherein selecting the gateway from the plurality of gateways further comprises selecting the gateway from the plurality of gateways based at least partly on network topology information gathered by the controller.

5. A method of using a controller to control switches in a network having end hosts that are coupled to the switches, wherein the controller is coupled to the switches via network control paths, and wherein the network is coupled to an external network having switches and end hosts that are coupled to the switches of the external network, the method comprising:
  receiving a network packet, from a given switch based on a flow table entry, at the controller, wherein the network packet includes a reserved network address associated with a virtual gateway Internet Protocol (IP) address;
  with the controller, determining whether the network packet is destined for an end host of the external network or destined for an end host of the network; and
  with the controller, controlling the switches to redirect the network packet to the end host of the network in response to determining that the network packet is destined for the end host of the network, wherein the flow table entry directs the given switch to rewrite a destination Ethernet address field of the network packet with an Ethernet address of the end host of the network;
  wherein the network is further coupled to a plurality of gateways that interface with the external network having switches and end hosts, the method further comprising:
  with the controller, selecting a gateway from the plurality of gateways in response to determining that the network packet is destined for an end host of the external network; and
  with the controller, controlling the switches of the network to forward the network packet to the end host of the external network through the selected gateway, wherein the flow table entry directs the switches to rewrite a source Ethernet address field of the network packet with a hardware address of a given one of the switches that is coupled to the selected gateway in response to determining that the network packet is destined for the end host of the external network.

6. The method defined in claim 5, wherein the network includes at least first and second subnetworks formed from respective portions of the end hosts, the method further comprising:
  with the controller, creating a virtual gateway by providing a first virtual gateway Ethernet address to the first subnetwork and providing a second virtual gateway Ethernet address to the second subnetwork, wherein the virtual gateway interfaces between the first subnetwork, the second subnetwork, and the external network.

7. The method defined in claim 6, wherein receiving the network packet comprises:
  receiving the network packet from a given subnetwork of the first and second subnetworks, wherein the network packet includes the virtual gateway Ethernet address of the given subnetwork.

8. The method defined in claim 7 further comprising:
with the controller, directing the switches to rewrite a source Ethernet address field of the network packet with the virtual gateway Ethernet address that is associated the given subnetwork in response to determining that the network packet is destined for the end host of the network.

9. The method defined in claim 5 further comprising:
with the controller, directing the switches to decrement a time-to-live header field of the network packet.

10. The method defined in claim 9, wherein controlling the switches to decrement the time-to-live header field of the network packet comprises:
providing a given one of the switches with a flow table entry that directs the given one of the switches to decrement the time-to-live header field of the network packet.

11. A method of using a controller to control switches in a network having end hosts that are coupled to the switches, wherein the controller is coupled to the switches via network control paths, the method comprising:
identifying whether a network packet sent from an end host is requesting a hardware address that corresponds to a reserved network address;
receiving the identified network packet, from a given switch based on a flow table entry, at the controller, wherein the network packet includes the reserved network address that is associated with a virtual gateway Internet Protocol (IP) address; and
the controller providing the end host with a reserved hardware address in response to determining that the network packet is requesting the hardware address that is associated with the reserved network address;
wherein the network is further coupled to a plurality of gateways that interface between the network and an external network, the method further comprising:
with the controller, controlling the switches of the network to forward the network packet to the end host of the external network through the selected gateway, wherein the flow table entry directs the given switch to modify the reserved hardware address in a destination Ethernet address field of the network packet with an Ethernet address of the selected gateway.

12. The method defined in claim 11, wherein the network includes at least first and second subnetworks formed from respective portions of the end hosts, wherein the end host is associated with the first subnetwork, the method further comprising:
with the controller, creating a virtual gateway associated with the reserved hardware address and the reserved network address, wherein the virtual gateway interfaces between the first and second subnetworks.

13. The method defined in claim 12 wherein creating the virtual gateway comprises:
controlling the switches to decrement time-to-live header fields of network packets that include the reserved network address.

14. The method defined in claim 12, further comprising:
with the controller, receiving a second network packet having the reserved hardware address from a given end host of the first subnetwork;
with the controller, selecting a second gateway from the plurality of gateways, wherein the selected second gateway includes a first interface for network traffic from the network to the selected second gateway and a second interface for network traffic from the selected gateway to the network; and
with the controller, directing the switches to forward the network packet through the first interface of the selected second gateway.

* * * * *